(12) United States Patent
Ohmi et al.

(10) Patent No.: US 6,690,702 B1
(45) Date of Patent: Feb. 10, 2004

(54) EXCIMER LASER OSCILLATION APPARATUS AND METHOD, EXCIMER LASER EXPOSURE APPARATUS, AND LASER TUBE

(75) Inventors: Tadahiro Ohmi, 1-17-301, Komegafukuro 2-chome, Aoba-ku, Sendai-shi, Miyagi-ken (JP); Nobuyoshi Tanaka, Tokyo (JP); Masaki Hirayama, Sendai (JP)

(73) Assignees: Canon Kabushiki Kaisha, Tokyo (JP); Tadahiro Ohmi, Miyaki-ken (JP)

( * ) Notice: Subject to any disclaimer, the term of this patent is extended or adjusted under 35 U.S.C. 154(b) by 0 days.

(21) Appl. No.: 09/528,183

(22) Filed: Mar. 17, 2000

(51) Int. Cl.$^7$ ............. H01S 3/04; H01S 3/00; H01S 3/223; H01S 3/09
(52) U.S. Cl. ............. 372/57; 372/37; 372/58; 372/90; 372/35
(58) Field of Search ............. 372/57, 82–84, 372/37, 58, 59, 92, 73, 90, 34, 35

(56) References Cited

U.S. PATENT DOCUMENTS 5,981,075 A    11/1999   Ohmi et al. ............ 428/428
6,331,994 B1 * 12/2001  Ohmi et al. ............ 372/82

FOREIGN PATENT DOCUMENTS

EP    0 820 132 A2    7/1997

OTHER PUBLICATIONS

Shuntaro Watanabe "Development and Applied Technique/Example of Excimer laser" p. 7 (1.1)–p.9 (1.9) (w/partial English translation), Mar. 30, 1989.

* cited by examiner

*Primary Examiner*—Quyen Leung
*Assistant Examiner*—Armando Rodriquez
(74) *Attorney, Agent, or Firm*—Fitzpatrick, Cella, Harper & Scinto

(57) ABSTRACT

In an excimer laser oscillation apparatus including a laser chamber (20) constituted by a laser tube (2) for storing a laser gas containing a gas mixture of at least one inert gas selected from the group consisting of Kr, Ar, and Ne, He and $F_2$ gas, and an optical resonator consisting of a pair of reflection mirrors (5, 6) arranged to sandwich the laser chamber (20) therebetween, the inner surface of the laser chamber (20) for storing the laser gas has a reflection-free surface with respect to light of a desired wavelength of 248 nm, 193 nm, or 157 nm, and the uppermost surface of the inner surface consists of a fluoride, and a means (waveguide 1) for introducing a microwave for exciting the laser gas in the laser chamber (20) is prepared. With this arrangement, an excimer laser oscillation apparatus, an oscillation method, and an exposure apparatus can be provided, which can reduce the load on the lens material and its surface, can simplify the mirror or laser scanning control system, and are satisfactorily used in mass production since the service life of an excimer laser can be sufficiently prolonged.

5 Claims, 38 Drawing Sheets

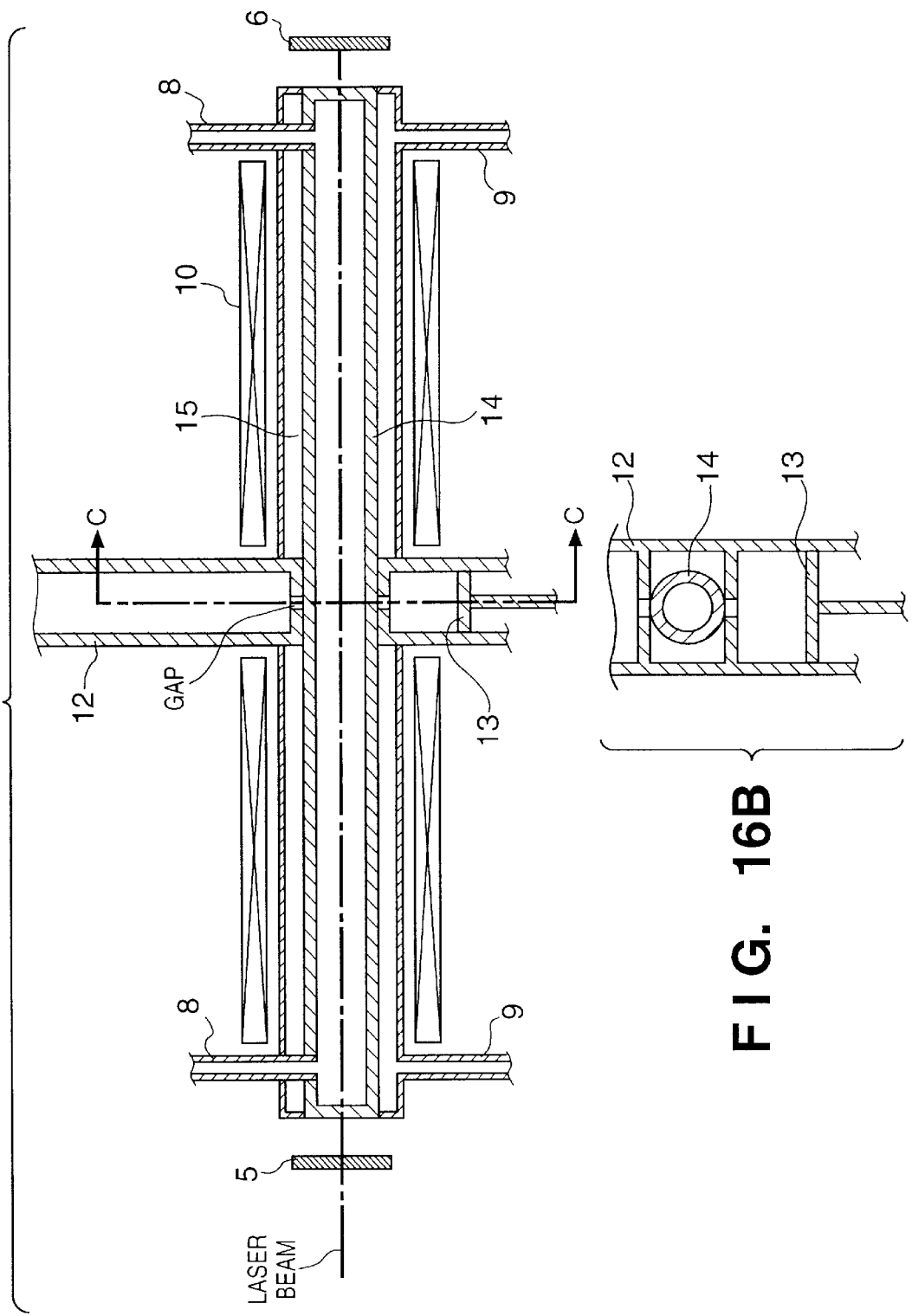

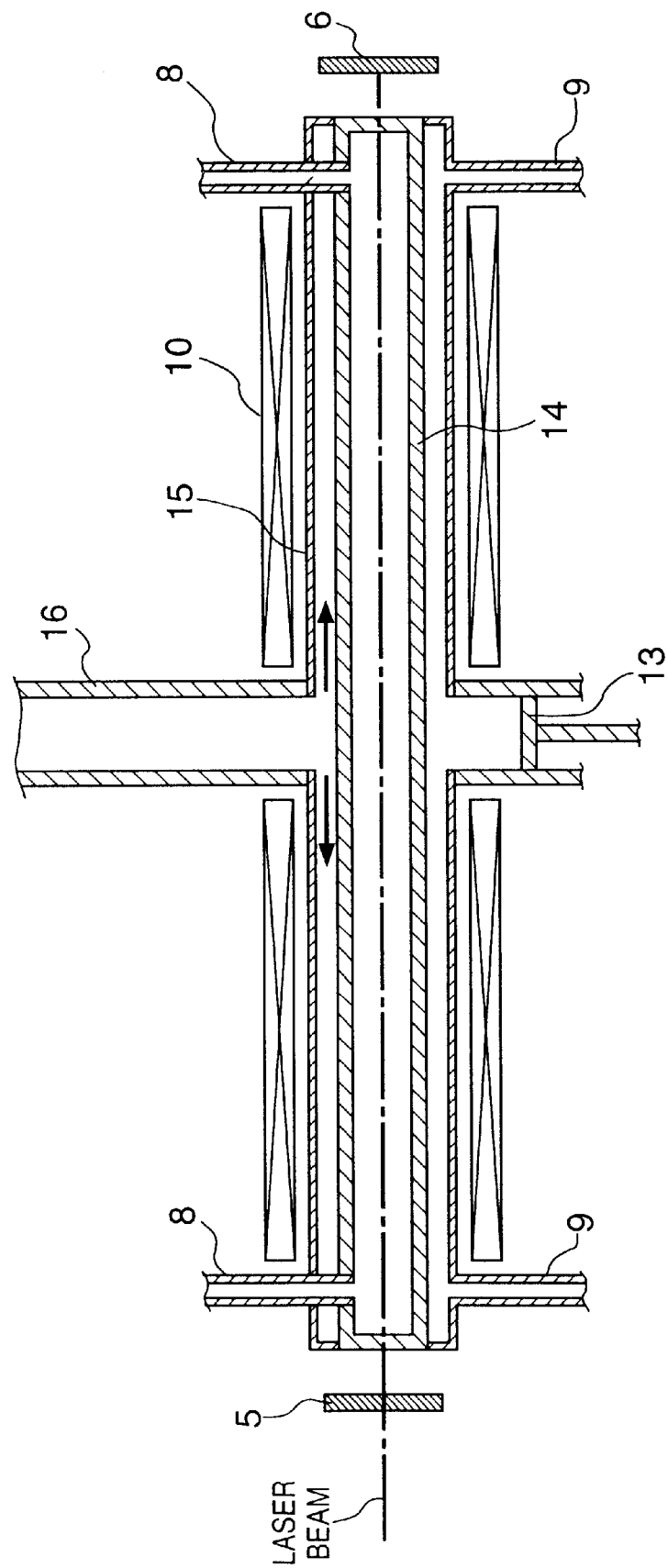

20 : LASER CHAMBER (LASER TUBE)

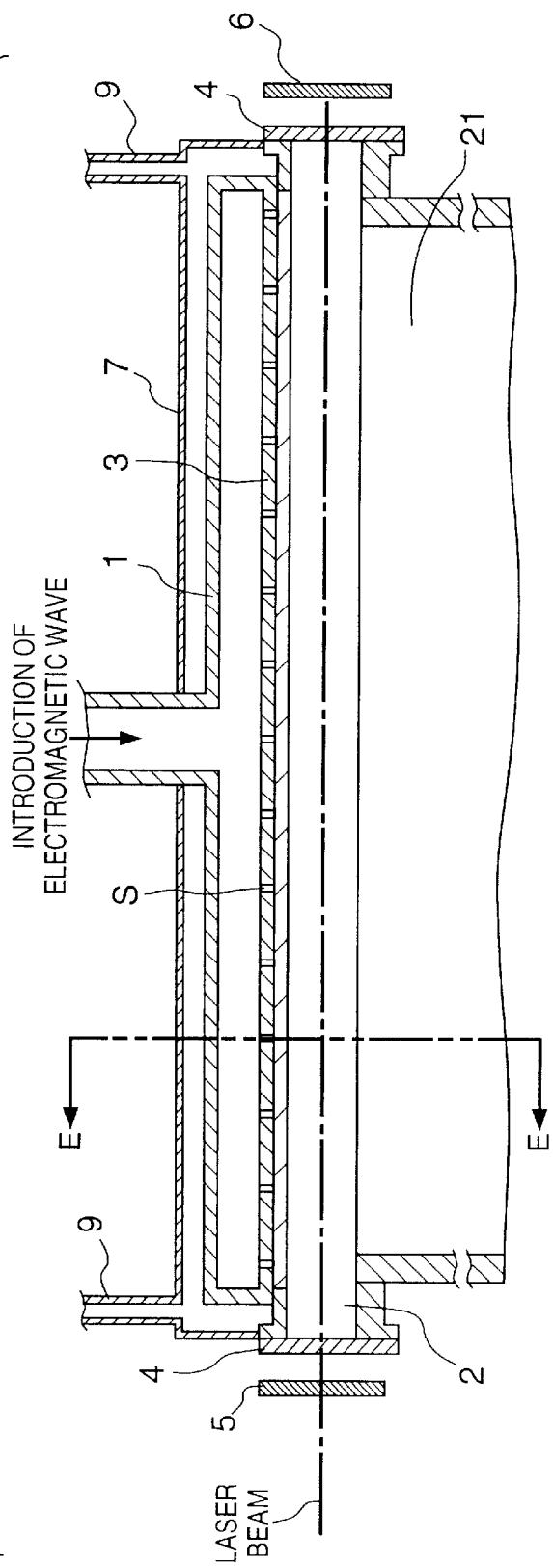
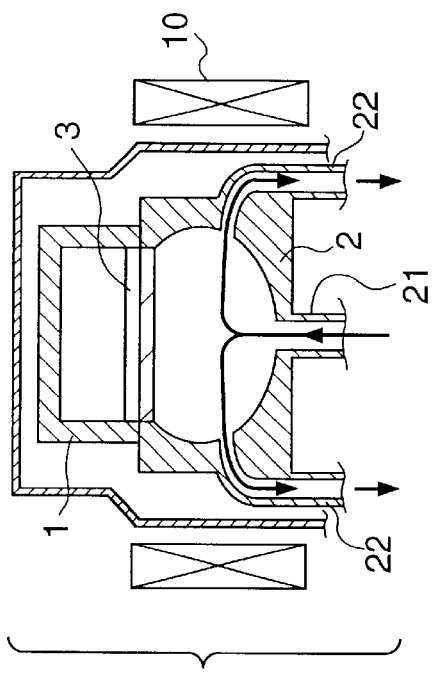

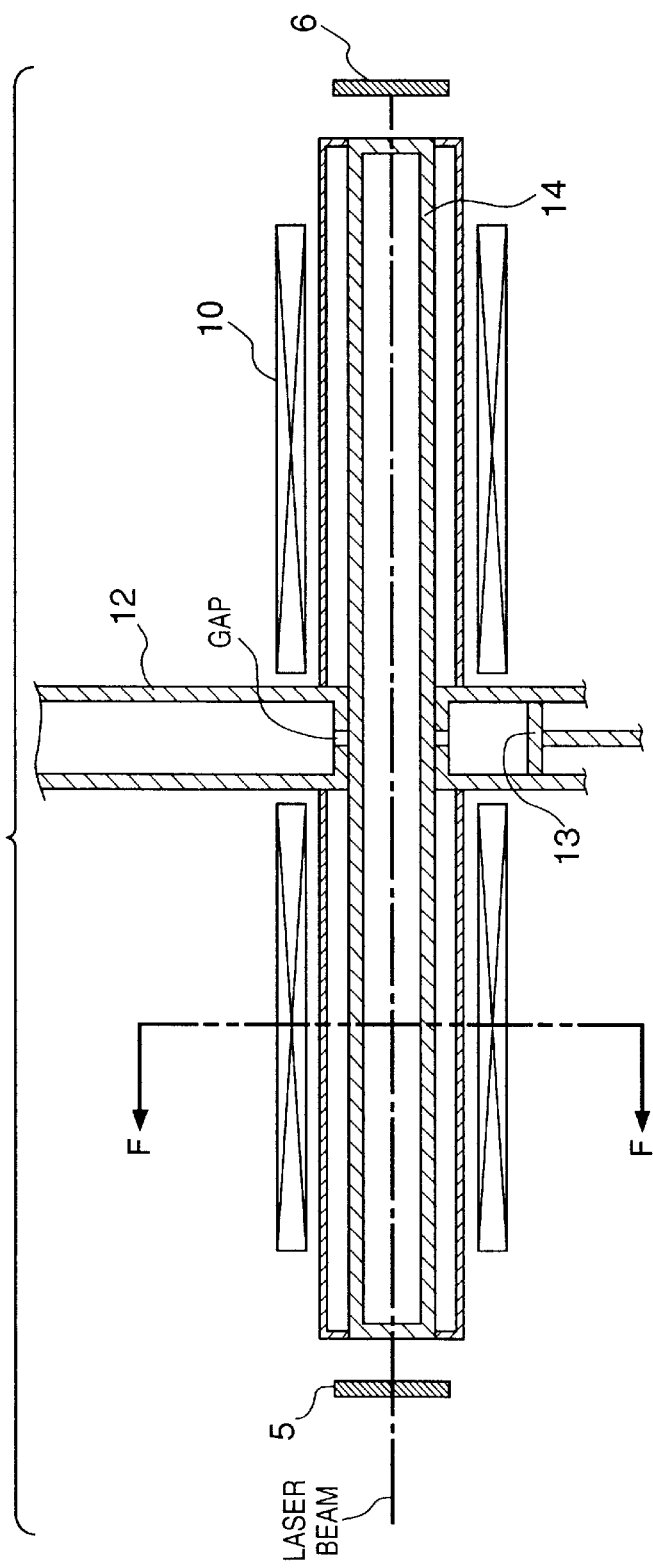
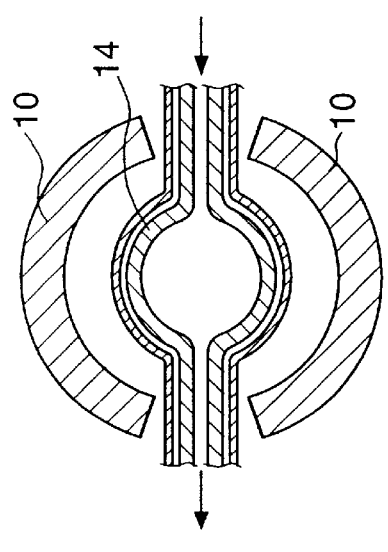

FIG. 26

KEY REACTION CHANNEL

I    $F_2 + e^- \rightarrow F^- + F$      ELECTRON ADHESION

II    $Kr + e^- \rightarrow Kr^* + e^-$      TWO-STAGE IONIZATION
     $Kr^* + e^- \rightarrow Kr^+ + 2e^-$ III    $Kr^+ + F + Ne \rightarrow KrF^* + Ne$      THREE-ELEMENT EXCIMER FORMATION REACTION
     $Kr + F_2 + Ne \rightarrow KrF^* + F + Ne$ IV    $KrF^* \rightarrow Kr + F + h\nu$      SPONTANEOUS EMISSION
     $KrF^* + h\nu \rightarrow Kr + F + 2h\nu$      SIMULATED EMISSION-LASER REACTION V    $F + F + Ne \rightarrow F_2 + Ne$      THREE-ELEMENT RECOMBINATION (VERY SLOW)

ABSORPTION REACTION

$F_2 + h\nu \rightarrow 2F$      PHOTODISSOCIATION $F^- + h\nu \rightarrow F + e^-$      NEUTRALIZATION BY PHOTON

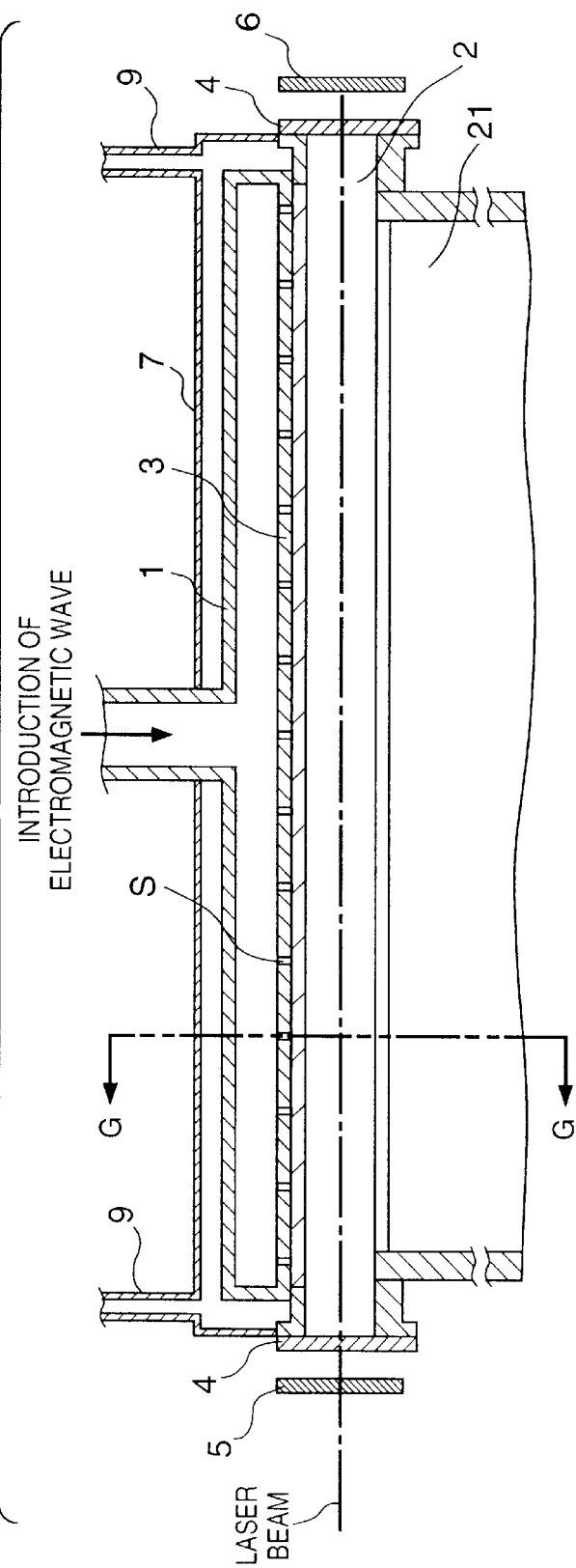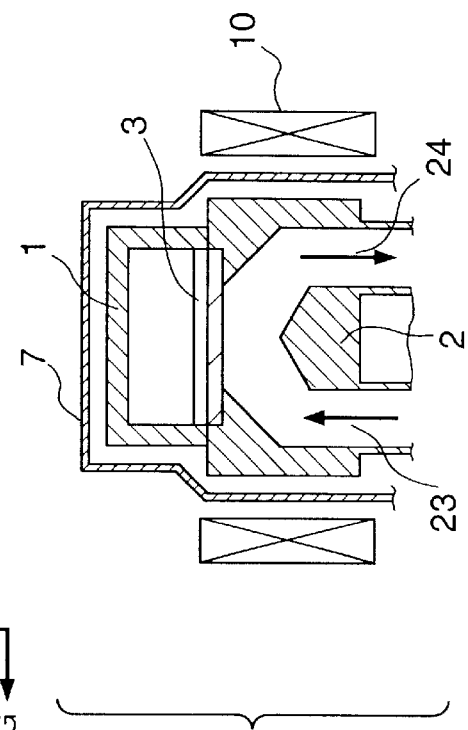

$$\omega_1{}^2 = \frac{2L}{kg_1}\left[\frac{g_1 g_2}{1 - g_1 g_2}\right]^{1/2}, \quad k = \frac{2\pi}{\lambda}$$

306 : MEANS FOR SHAPING LASER GAS INTO LAMINAR FLOW (BAFFLE PLATE)

$\lambda_g \cdot 1$ WAVELENGTH

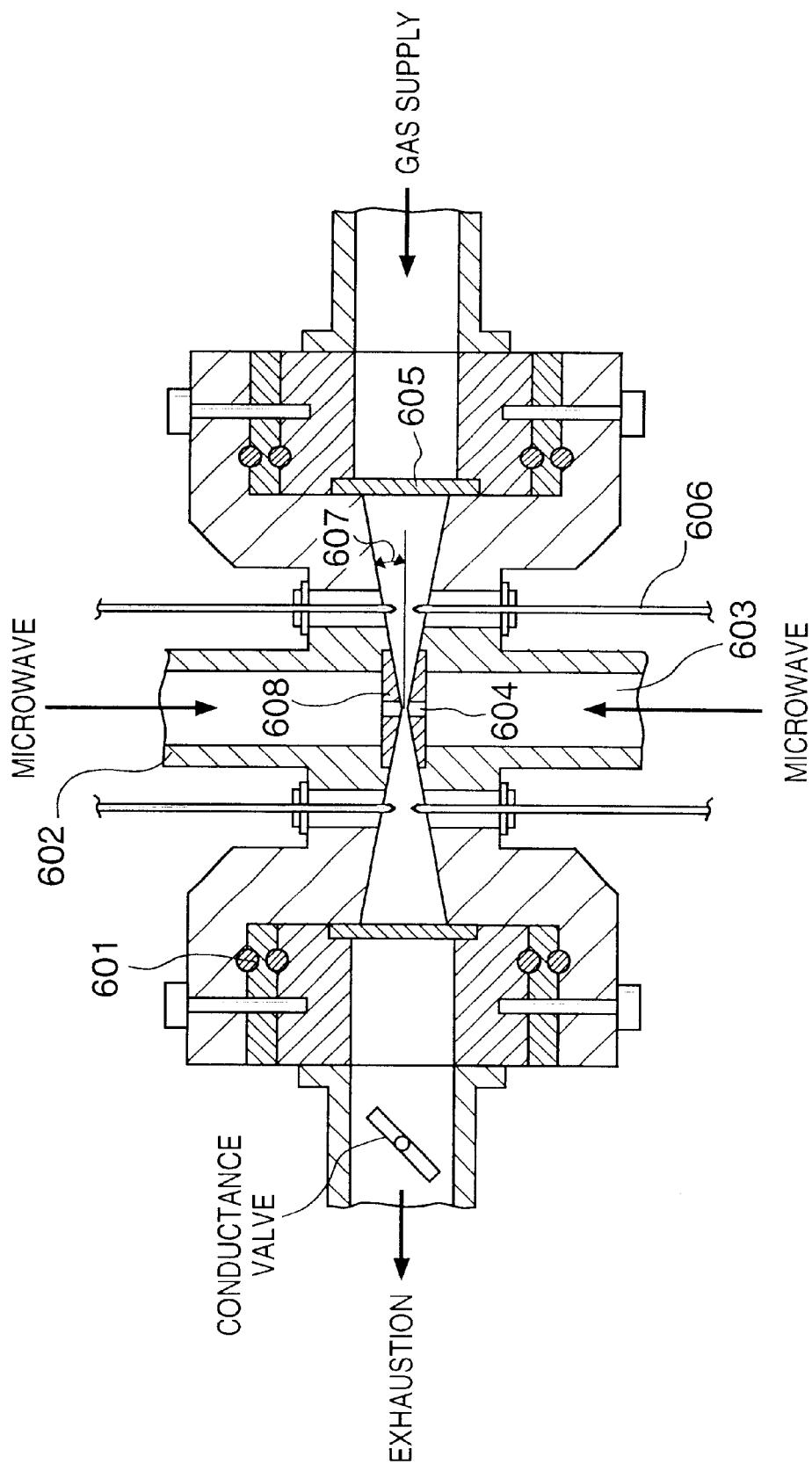

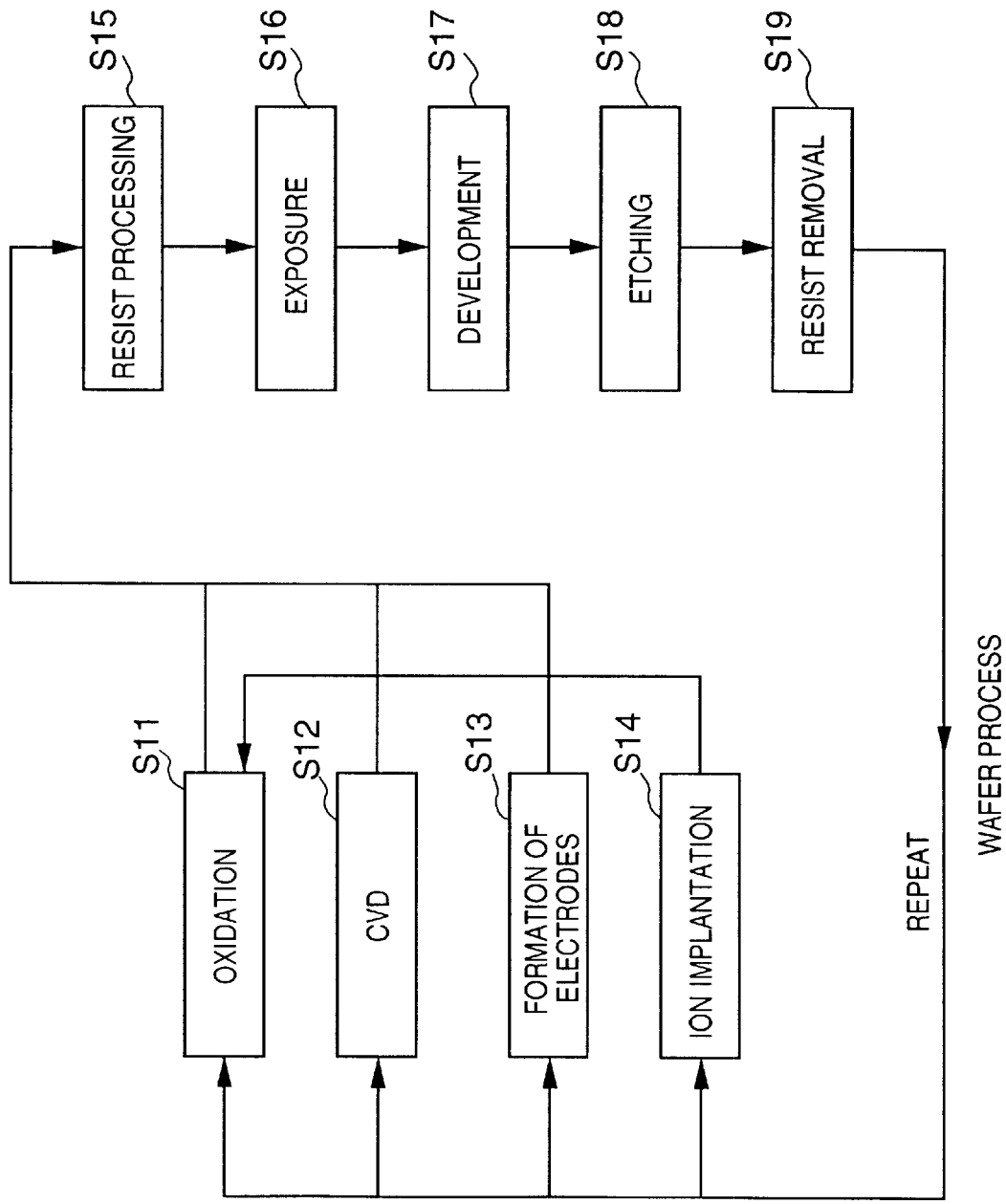

EXCIMER LASER OSCILLATION APPARATUS AND METHOD, EXCIMER LASER EXPOSURE APPARATUS, AND LASER TUBE

FIELD OF THE INVENTION

The present invention relates to an excimer laser oscillation apparatus and method, an excimer laser exposure apparatus, and a laser tube.

BACKGROUND OF THE INVENTION

An excimer laser has received a lot of attention as one and only high-power laser that can oscillate in the ultraviolet region, and its applications are expected in the electronics, chemical, and energy industries. More specifically, the excimer laser is used in working, chemical reactions, and the like of metals, resins, glass, ceramics, semiconductors, and the like.

An apparatus for generating an excimer laser beam is known as an excimer laser oscillation apparatus. A laser gas, e.g., Ar, Kr, Ne, $F_2$, He, Xe, $Cl_2$ and the like filled in a laser tube is excited by electron beam radiation, discharge, or the like. The excited F atoms bind to inactive Kr·Ar atoms in the ground state to form molecules KrF*, ArF* that can exist in only an excited state. Such molecules are called excimers. Since the excimers are unstable, they immediately emit ultraviolet rays and drop to the ground state. An excimer laser oscillation apparatus utilizes the ultraviolet rays and amplifies them as in-phase light in an optical resonator made up of a pair of reflection mirrors to output a laser beam.

Conventionally, it is impossible for an excimer laser oscillation apparatus to attain continuous excitation since the lifetime of excimers as a laser medium is very short, and pulse excitation that intermittently supplies fast-rise-time current pulses (about 10 nsec) is normally performed.

For this reason, the service life of electrodes in the conventional excimer laser oscillation apparatus is as short as about half a year.

On the other hand, when, for example, a chemical sensitization type resist is exposed using a pulse oscillation type continuous emission excimer laser oscillation apparatus having a repeating frequency of 100 Hz to 1 kHz in a semiconductor working process, the service life of a lens material and a reflection-free multilayered film on the surface of the lens material is very short. Such a problem will be explained in detail below.

The sensitivity of the chemical sensitization type resist is about 20 $mJ/cm^2$. Hence, light of 0.1 $W/cm^2$ requires an exposure time of 0.2 sec. On the other hand, light of 1 $W/cm^2$ requires an exposure time of 0.02 sec. In consideration of considerable losses in the optical system, an optical output of about 10 W suffices.

In pulse emission (1 kHz) used today, pulse light of about 10 nsec is generated about 1,000 times per sec. If the exposure time is 0.2 sec, 200 pulses and 20 $mJ/cm^2$ are required. Assuming that energy drops to 1/100 due to losses of the optical system, the emission intensity $I_0$ of each pulse is described as follows in consideration of the pulse duty shown in FIG. 2:

$I_0$(watt)×10 (nsec)×2$_{33\ 10}^2$ (pulses)×10$^{31\ 2}$ (efficiency)= 2×10$^{-2}$ (Joule)

$$I_0 = 2\times 10^{-2}/10^{-8} \times 2$$
$$= 1\times 10^6 \text{ (watt)}$$

If a constant optical output can be obtained for 10 nsec, pulse light of 1 MW is obtained. In practice, pulse light shown in FIG. 3 is obtained.

In practice, since the pulse light has a pulse waveform shown in FIG. 3, the intensity of pulse light has a peak power ranging from 2 to 3 MW. Since short-wavelength light of several MW intermittently is incident, the durability requirement of the lens material and the reflection-free multilayered film on its surface becomes very severe.

In the era of excimer laser lithography, step-and-repeat exposure is not simultaneously performed, but scanning exposure by scanning a mirror or lens is performed. When about 1,000 light pulses are generated per sec, and the exposure time is 0.2 sec, only bout 200 pulses can be used per exposure. If, for example, a 25×35 $mm^2$ area is to be exposed uniformly, the relative relationship between scanning of the mirror or lens and the pulse light must be very strictly controlled, and a very complicated control system is required in optical elements. In addition, at present the pulse light outputs fluctuate by about 10%. For this reason, the mirror or lens scanning control system must inevitably be made very complicated, resulting in a sophisticated, expensive excimer laser exposure apparatus.

Furthermore, the conventional laser oscillation apparatus also has the following problem. That is, since a KrF laser and an ArF laser of excimer lasers use highly reactive fluorine gas as a laser gas, the concentration of fluorine in the laser chamber that stores the laser gas and gives discharge energy to the gas is low. In consideration of this, the voltage supplied to the laser chamber is raised so as to obtain a predetermined output. When the predetermined output becomes hard to obtain even by such control, oscillation is interrupted, and fluorine gas is refilled. When oscillation further continues, finally the predetermined laser gas output cannot be obtained even by refilling fluorine, and the laser chamber must be exchanged in such a state.

In the case of an excimer laser emission apparatus that emits light for about several 10 ns by discharge using voltage pulses, since the emission time is too short, the wavelength half width of the light emission spectrum of outgoing light is as wide as about 300 pm. For this reason, a wavelength half width of 1 pm or less can be obtained by monochromating using a narrow-band module such as a grating or the like.

In the existing techniques, fluorine gas must be refilled at predetermined intervals, and oscillation must be done by raising the applied voltage. In other words, fluorine gas decreases in amount due to reaction with, e.g., the chamber inner surface as time elapses. Therefore, the service life of the laser chamber is not satisfactory, and in particular, when a laser is used to work articles for a long period of time, the service life of the chamber is an important factor in improving the manufacturing throughput of worked articles.

A wavelength half width of 1 pm or less can be currently obtained by monochromating using a narrow-band module such as a grating or the like. However, the emission intensity of outgoing light decreases due to a narrow bandwidth using a grating or the like, and such a decrease in intensity seriously disturbs improvement of the manufacturing throughput of worked articles.

SUMMARY OF THE INVENTION

It is an object of the present invention to provide an excimer laser oscillation apparatus and method, and an exposure apparatus, which can reduce the load on the lens material and its surface, can simplify the mirror or laser scanning control system, and are satisfactorily used in mass production since the service life of an excimer laser can be sufficiently prolonged.

It is another object of the present invention to provide an excimer laser oscillation apparatus and method, which can realize a narrow bandwidth while increasing the intensity of outgoing light.

It is still another object of the present invention to provide an excimer laser exposure apparatus which can achieve a spectrum with a narrow wavelength width without using any narrow-band module, and can realize a compact, simple apparatus.

An excimer laser oscillation apparatus of the present invention is characterized by comprising a laser gas chamber which stores a laser gas, and a waveguide for introducing a microwave for exciting the laser gas, wherein the waveguide has slots in each of which a wedge-shaped dielectric member is buried.

An excimer laser oscillation apparatus of the present invention is characterized by comprising a laser gas chamber which stores a laser gas, and a waveguide for introducing a microwave for exciting the laser gas, wherein a gas pressure of the laser gas falls within a range from several ten Torr to 3 atm, and the waveguide includes a slot-antenna, and the slot-antenna guides the microwave to the laser gas with the gas pressure in the laser gas chamber.

An excimer laser oscillation apparatus of the present invention is characterized by comprising a laser gas chamber for storing a laser gas, and a waveguide for introducing a microwave for exciting the laser gas, wherein the waveguide comprises slots formed in an outer wall portion thereof, a first dielectric member arranged in the slots, and a second dielectric member arranged in the waveguide and made of a material different from the first dielectric member.

An excimer laser oscillation method of the present invention is characterized by comprising the steps of continuously supplying a laser gas containing a gas mixture of at least one inert gas selected from the group consisting of Kr, Ar, and Ne, and $F_2He$ gas into a laser chamber in which an inner surface thereof has a reflection-free surface with respect to light of a desired wavelength of 248 nm, 193 nm, or 157 nm, and an uppermost surface of the inner surface consists of a fluoride, making the inner surface of the laser chamber for storing the laser gas have a reflection-free surface with respect to light of a desired wavelength of 248 nm, 193 nm, or 157 nm, and making an uppermost surface of the inner surface consist of a fluoride, and continuously exciting the laser gas by introducing a microwave into the laser chamber.

An excimer laser exposure apparatus of the present invention is characterized by comprising the excimer laser oscillation apparatus described above, an illumination optical unit, an imaging optical unit, and a stage for holding a wafer.

An excimer laser of the present invention is characterized by comprising a laser chamber for storing an excimer laser gas, an optical resonator consisting of a pair of reflection mirrors arranged to sandwich the laser chamber therebetween, light selection means, arranged in an optical path of the optical resonator, for selecting light to be oscillated, microwave introduction means for exciting the excimer laser gas, and control means for controlling the microwave introduction means to introduce a microwave, and controlling the light selection means to change light to be selected when oscillation of an excimer laser is stopped.

A laser oscillation apparatus of the present invention comprising a laser chamber constituted by a laser tube for storing a laser gas, and an optical resonator made up of a pair of reflection mirrors arranged to sandwich the laser chamber, characterized in that the apparatus comprises means for introducing a microwave for exciting the laser gas in the laser chamber, the microwave introduction means being arranged along an optical axis of the optical resonator, and a distance between the microwave introduction means and an optical axis of the optical resonator is changed in a direction of the optical axis in accordance with changes, in the direction of the optical axis, in beam spot radius in a direction perpendicular to the optical axis.

An excimer laser oscillation apparatus of the present invention comprising a laser chamber constituted by a laser tube for storing a laser gas containing a gas mixture of at least one inert gas selected from the group consisting of Kr, Ar, and Ne, and $F_2He$ gas, and an optical resonator consisting of a pair of reflection mirrors arranged to sandwich the laser chamber therebetween, characterized in that an inner surface of the laser chamber for storing the laser gas has a reflection-free surface with respect to light of a desired wavelength of 248 nm, 193 nm, or 157 nm, and an uppermost surface of the inner surface consists of a fluoride, the apparatus further comprises means for introducing a microwave for continuously exciting the laser gas in the laser chamber, and a reflectance of the reflection mirror on an output side is set to not less than 90%.

An excimer laser oscillation method of the present invention is characterized by comprising the steps of continuously supplying a laser gas containing a gas mixture of at least one inert gas selected from the group consisting of Kr, Ar, and Ne, and $F_2He$ gas into a laser chamber in which an inner surface thereof has a reflection-free surface with respect to light of a desired wavelength of 248 nm, 193 nm, or 157 nm, and an uppermost surface of the inner surface consists of a fluoride, making the inner surface of the laser chamber for storing the laser gas have a reflection-free surface with respect to light of a desired wavelength of 248 nm, 193 nm, or 157 nm, and making an uppermost surface of the inner surface consist of a fluoride, continuously exciting the laser gas by introducing a microwave into the laser chamber, and continuously emitting light by producing resonance using a pair of reflection mirrors, the reflection mirror on an output side having a reflectance of not less than 90%.

An excimer laser exposure apparatus of the present invention is characterized by comprising the excimer laser oscillation apparatus described above, an illumination optical unit for guiding light emitted from the excimer laser oscillation apparatus, an imaging optical unit for imaging the light guided by the illumination optical unit on an exposure target, and a stage for holding the exposure target.

A device fabrication method of the present invention is characterized by comprising the steps of preparing the excimer laser exposure apparatus described above, and forming a device on an exposure target by using the excimer laser exposure apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 16A and 16B are cross-sectional views of a continuous emission excimer laser oscillation apparatus having a microwave supply device;

FIG. 18 is a cross-sectional view of a continuous emission excimer laser oscillation apparatus having a microwave supply device;

FIGS. 24A and 24B are schematic views showing an excimer laser oscillation apparatus according to another example of the present invention;

FIGS. 25A and 25B are schematic views showing an excimer laser oscillation apparatus according to still another example of the present invention;

FIG. 26 shows the reaction formulas of an excimer;

FIGS. 27A and 27B are cross-sectional views showing another continuous emission excimer laser oscillation apparatus having a microwave supply device;

FIGS. 35A and 35B are sectional views of a laser oscillation apparatus.

FIG. 37 is a view showing the detailed flow of a wafer process in FIG. 36.

DETAILED DESCRIPTION OF THE PREFERRED EMBODIMENTS

Figure 1:
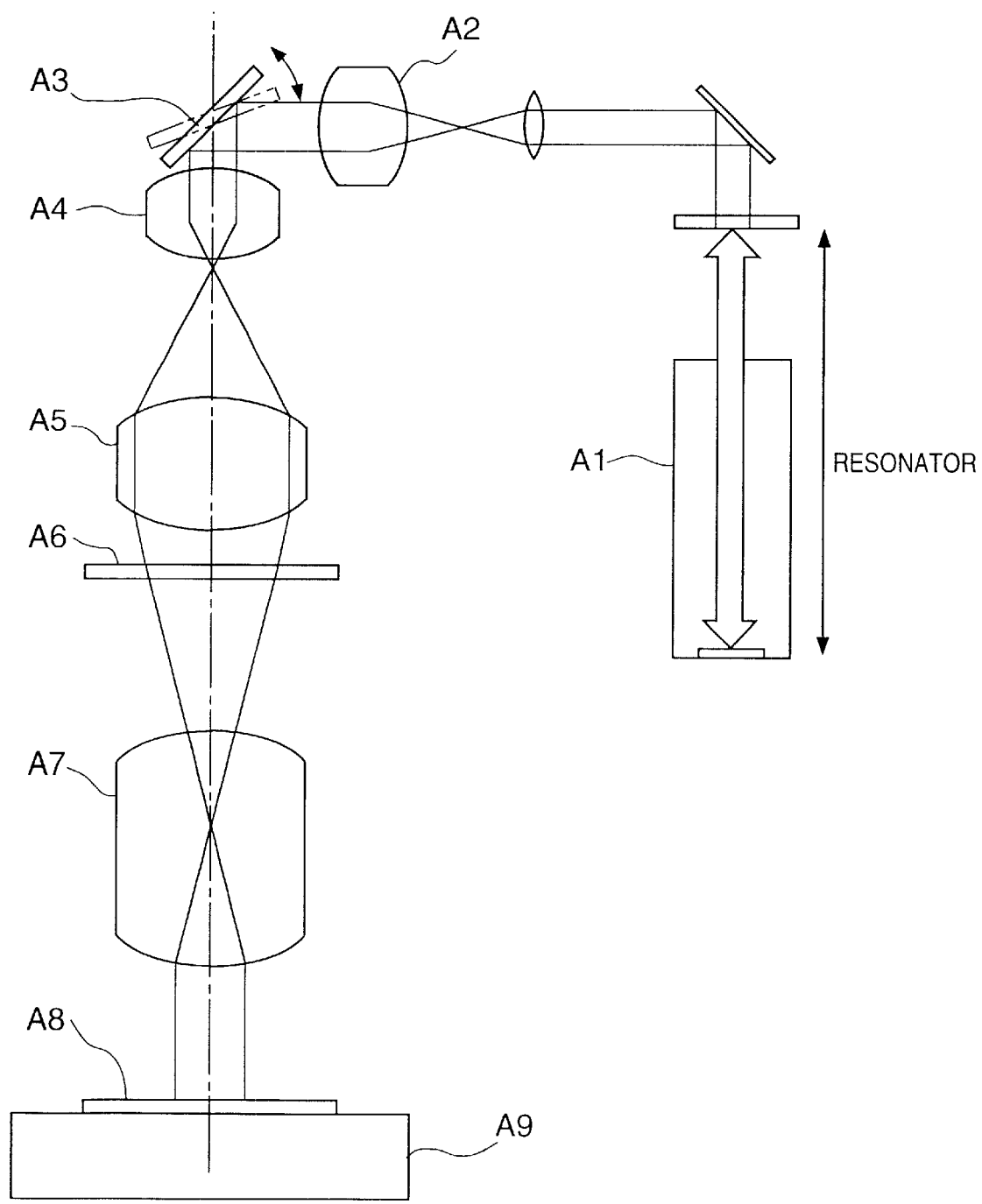
FIG. 1 is a schematic view showing an excimer laser exposure apparatus.
Figure 2:
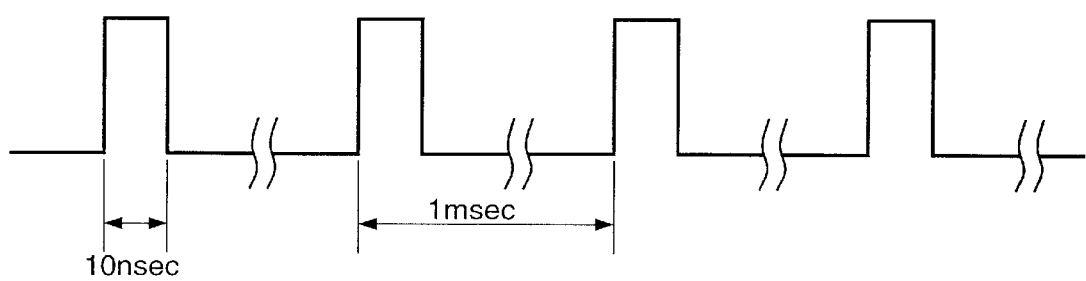
FIG. 2 is a schematic view showing a pulse state.
Figure 3:
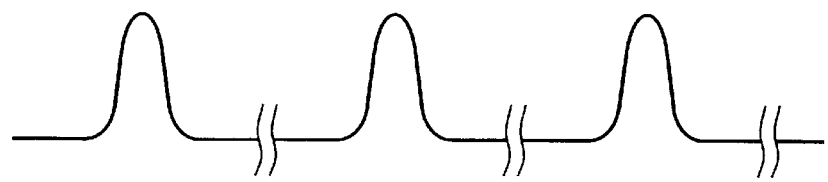
FIG. 3 is a schematic view showing a real pulse state.
Figure 4:
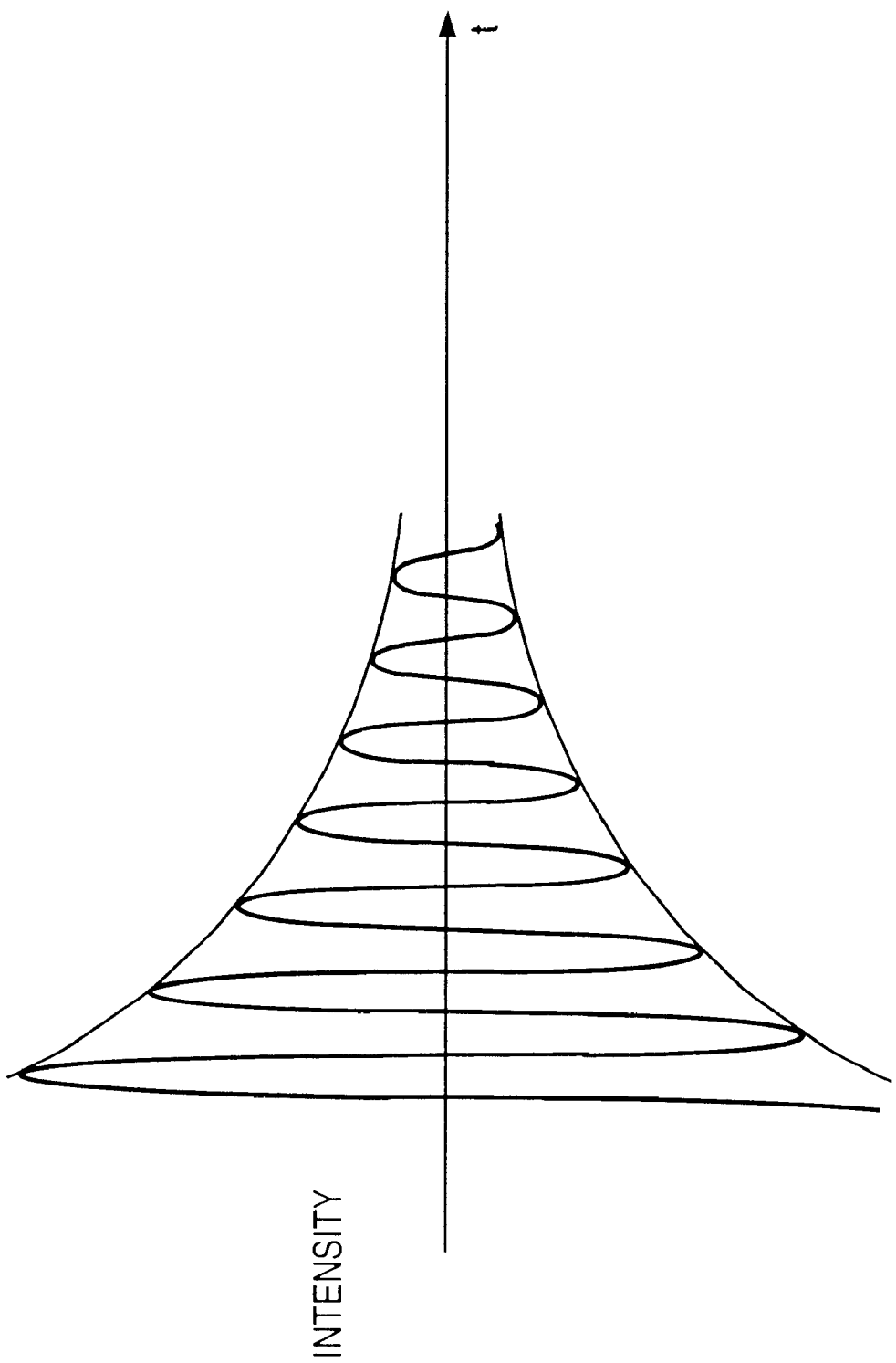
FIG. 4 is a graph showing an attenuated state of spontaneous emission.
Figure 5A:
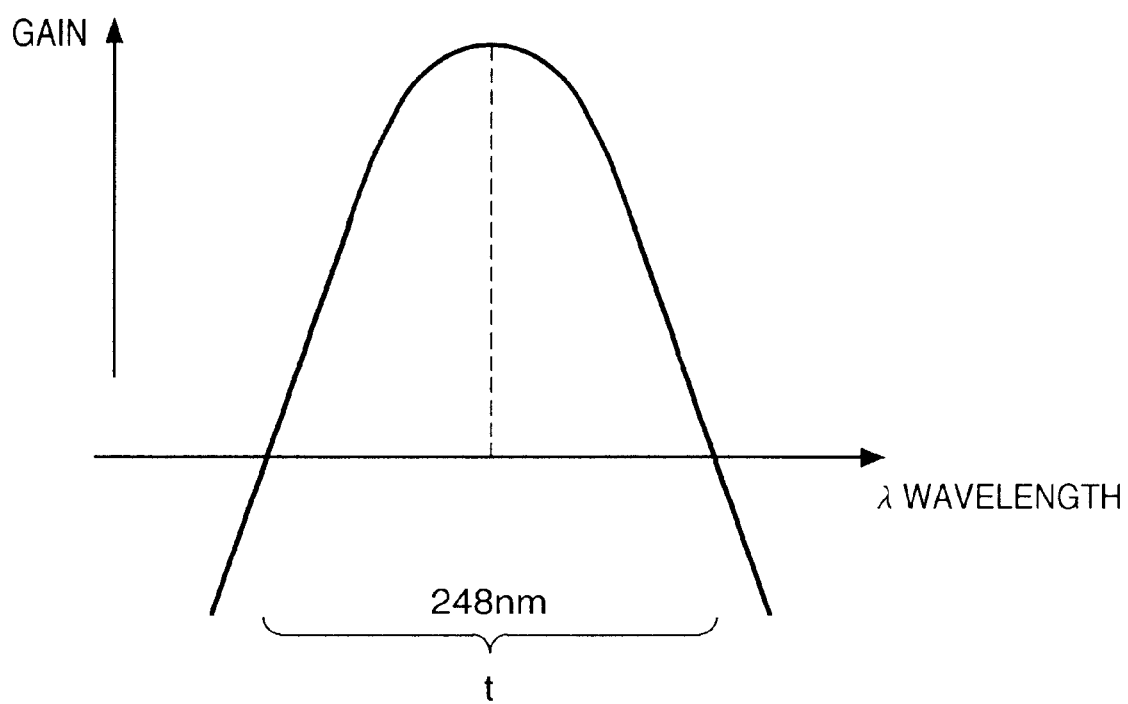
FIGS. 5A and 5B are graphs respectively showing a gain width and a mode state.
Figure 5B:
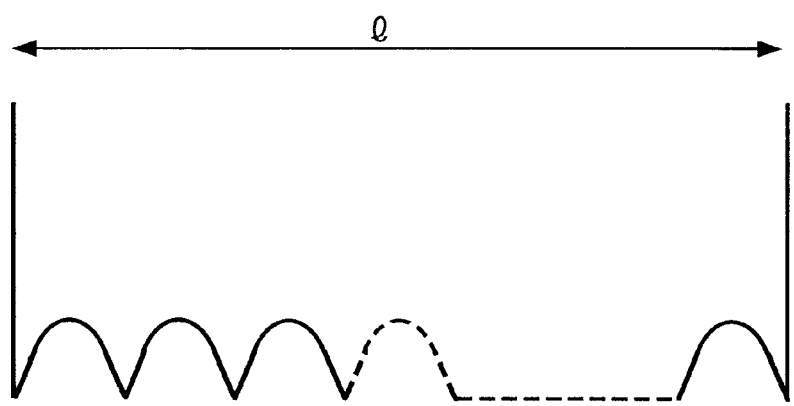
Figure 6:
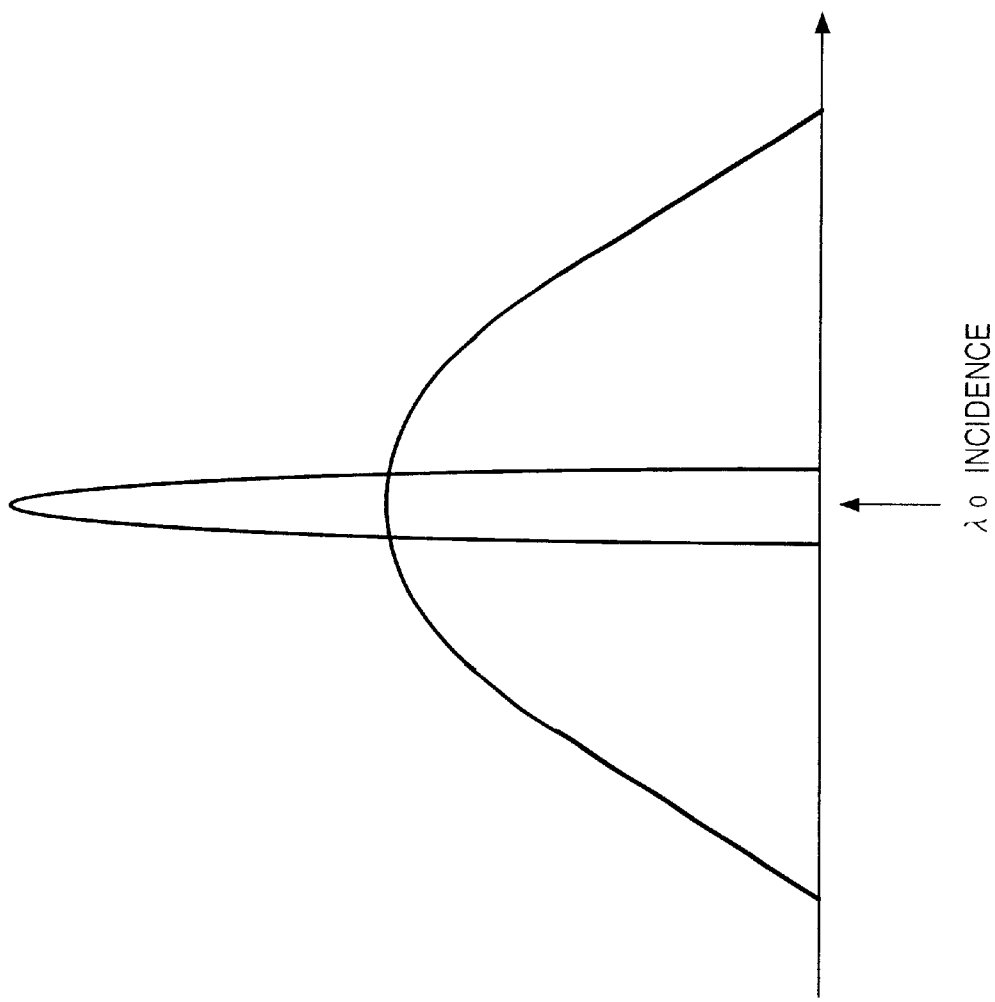
FIG. 6 is a graph showing how light converges in an excimer laser.

Preferred embodiments of the present invention will be described in detail in accordance with the accompanying drawings.

First Embodiment

The effects of the present invention will be explained hereinafter together with knowledge and embodiments obtained upon achieving the invention.

In the present invention, since continuous emission is done, the need for controlling the relative relationship between scanning of the mirror or lens and the pulses can be obviated, and the control of the optical system can be very simple.

As analyzed by the present inventors, since light of 0.1 W/cm$^2$ requires an exposure time of 0.2 sec and light of 1 W/cm$^2$ requires an exposure time of 0.02 sec, an output of about 10 W suffices in consideration of light losses in the optical system, and the service life of the lens material and its surface can be prolonged.

Furthermore, the following effects are attained.

First, damage to the optical material such as glass is reduced. A general excimer laser such as a KrF laser, an ArF laser, an $F_2$ laser, a $Kr_2$ laser, an ArKr laser, an $Ar_2$ laser, or the like, produces pulse emissions as short as 10 to 20 nsec, while the repeating frequency of the pulse is about 1,000 Hz. Accordingly, the peak light intensity of this pulse is 10,000 times or more than that obtained by continuous emission at an identical intensity regardless of the efficiency of the optical system. The major cause of damage to the material in the excimer region lies in two-photon absorption, and optical damage in the existing excimer laser which is proportional to the square of the peak intensity of light is at least 10$^4$ times stricter than those in continuous emission. The durability of the glass material poses a problem in the ArF region for the above-mentioned reasons. Hence, realization of a continuous emission light source can solve material problems in the ultraviolet region as well as the ArF region.

Second, production of speckles as a phenomenon inherent to light in a narrow band can be easily suppressed. In the case of pulse emission, in order to effectively remove speckles as random interference fringes, the light emission timings of the individual pulses and a known speckle removal means must by synchronized with high precision. In contrast to this, continuous oscillation does not require any special synchronization means, and speckles can be easily removed by a known, simple means such as a rotary diffusion plate. For this reason, the arrangement of the optical system can be simplified, and a cost reduction can be effectively attained.

Third, exposure amount control is easy. When discrete exposure such as pulse emission in performed, the minimum unit in exposure amount control basically depends on the number of pulses although it also depends on the controllability of the exposure amount per pulse. When exposure is attained by a total of 100 pulses, the next unit is 99 pulses or 101 pulses, and the control precision is ±1%. Of course, various means for controlling the last one pulse have been proposed, but finer exposure amount control free from any resolution owing to discreteness is preferable for controllability or control. As the line width decreases, stricter exposure amount control is required. Under such circumstances, the effect of the continuous emission light source is tremendous.

As described above, conventionally, it is impossible for an excimer laser to attain continuous emission since the energy levels in the excimer state have a short lifetime and atoms cannot be maintained at the excited level for a certain period of time and, hence, fast-rise-time pulse excitation must be performed.

In the present invention, the inner surface of a laser chamber for storing a laser gas is made up of a reflection-free surface with respect to light having desired wavelengths such as 248 nm, 193 nm, and 157 nm.

The reason why the inner surface of the laser chamber is made up of the reflection-free surface is to prevent spontaneously emitted light from being reflected by the inner surface of the laser chamber and returning to the gas to transmit KrF* or ArF* from the excited state to the ground state.

Note that the reflection-free surface need not always have a 100% transmittance or absorbency but may have a certain reflectance. In this case, the reflectance is preferably 50% or less, more preferably, 20% or less, and most preferably, 5% or less. That is, the reflectance may be appropriately selected so that a uniform laser beam can be obtained upon connecting to an actual apparatus.

Furthermore, in order to prevent $F_2$ from decreasing in an amount due to reaction with the laser chamber, the inner surface of the laser chamber is made up of a fluoride. In particular, the inner surface of the laser chamber is obtained by forming an $FeF_2$ layer on a stainless steel surface, which is stable with respect to $F_2$, by plating nickel on a metal and forming an $NiF_2$ layer on the surface of the nickel plating layer, or by forming $AlF_3$ and $MgF_2$ layers on an aluminum alloy.

Note that a fluoride that is formed by fluoridation of a metal with fluorine gas and substantially satisfies stoichiometry is preferable as a fluoride to be used.

In the present invention, the reflectance of a reflection mirror on the output side is set at 90% or more.

In the arrangement of an existing resonator, a 100% reflectance is set on one side, while a reflectance of about 10% is set on the output side.

The laser gas composition of the conventional KrF* excimer laser is as follows:

$Kr/Ne/F_2$=less than 1%: 98%: less than 1%.

The $F_2$ concentration is as low as 1% or less. If the $F_2$ concentration is too much, electrons are absorbed by F and become anions, resulting in unstable discharge. On the other hand, the pressure is set at 3 to 4 atm. Such pressure is set to compensate for a low $F_2$ concentration and to produce KrF* as much as possible.

An output of about 10 W suffices continuous emission. An allowable gain $\alpha_2$ will be estimated below.

Laser Beam Intensity in Resonator

Most upper-level excimers vanish by collision unless the laser operates at an intensity as high as about a saturated intensity $I_s$. The saturated intensity is an intensity at which a gain becomes ½ a small-signal gain $g_0$, and is obtained as follows in the case of the KrF excimer laser (Shuntaro Watabe, "Development and Applied Techniques/Examples of Excimer laser"):

$I_s = h\nu/\sigma\tau$ $= 1.3 \text{ MW/cm}^2$ h: Plank constant $6.63 \times 10^{34}$ J$_s$ $\nu$: frequency $3 \times 10^8/0.248 \times 10^{-6} = 1.2 \times 10^{15}$ $\sigma$: induced emission section area $2 \times 10^{-16}$ cm$^2$ $\tau$: upper-level lifetime 3 ns (including deexcitation due to collision).

The upper-level lifetime $\tau$ can be increased to a maximum of an emission lifetime (that in free space). The lifetime in this case has 6.7 ns, and the saturated intensity $I_s$ is:

$I_s + 0.6 \text{ MW/cm}^2$.

This efficiency is given by the ratio of the number of photons taken out per unit volume per second to the number of excimers produced. The laser taking out efficiency $\eta_{ex}$ is obtained by:

$$\eta_{ex} = (I/I_s)(1+(1+I/I_s) - \alpha_n/g_0)$$

I: laser beam intensity $I_s$: saturated intensity $\alpha_n$: unsaturated absorption coefficient $g_0$: small-signal gain.

Since $\alpha_n > 0$, the following relation holds:

$$\eta_{ex} < (I/I_s)/(1+I/I_s).$$

When the laser beam intensity I is equal to or smaller than $I_s$, laser oscillation has poor efficiency. For example, when the laser beam intensity I in the resonator is 500 W/cm$^2$, the efficiency $\eta_{ex}$ is:

$\eta_{ex} = 1/2600$ or less (the laser taking out efficiency $\eta_{ex}$ is very small).

Accordingly, in order to attain efficient laser oscillation, a saturated intensity of about 1.3 MW/cm$^2$ is required.

The preferred embodiments of the present invention will be described below.

Laser Gas

In the present invention, the laser gas as a laser medium consists of a gas mixture of at least one inert gas selected from the group consisting of Kr, Ar, Ne, He and $F_2$ gas.

Of these gases, different gases can be appropriately combined in correspondence with the wavelength to be used. For example, when the wavelength is 248 nm, a combination of $Kr/Ne/F_2$ is used; when 193 nm, $Ar/Ne/F_2$; when 157 nm, $He/F_2$.

Figure 7:
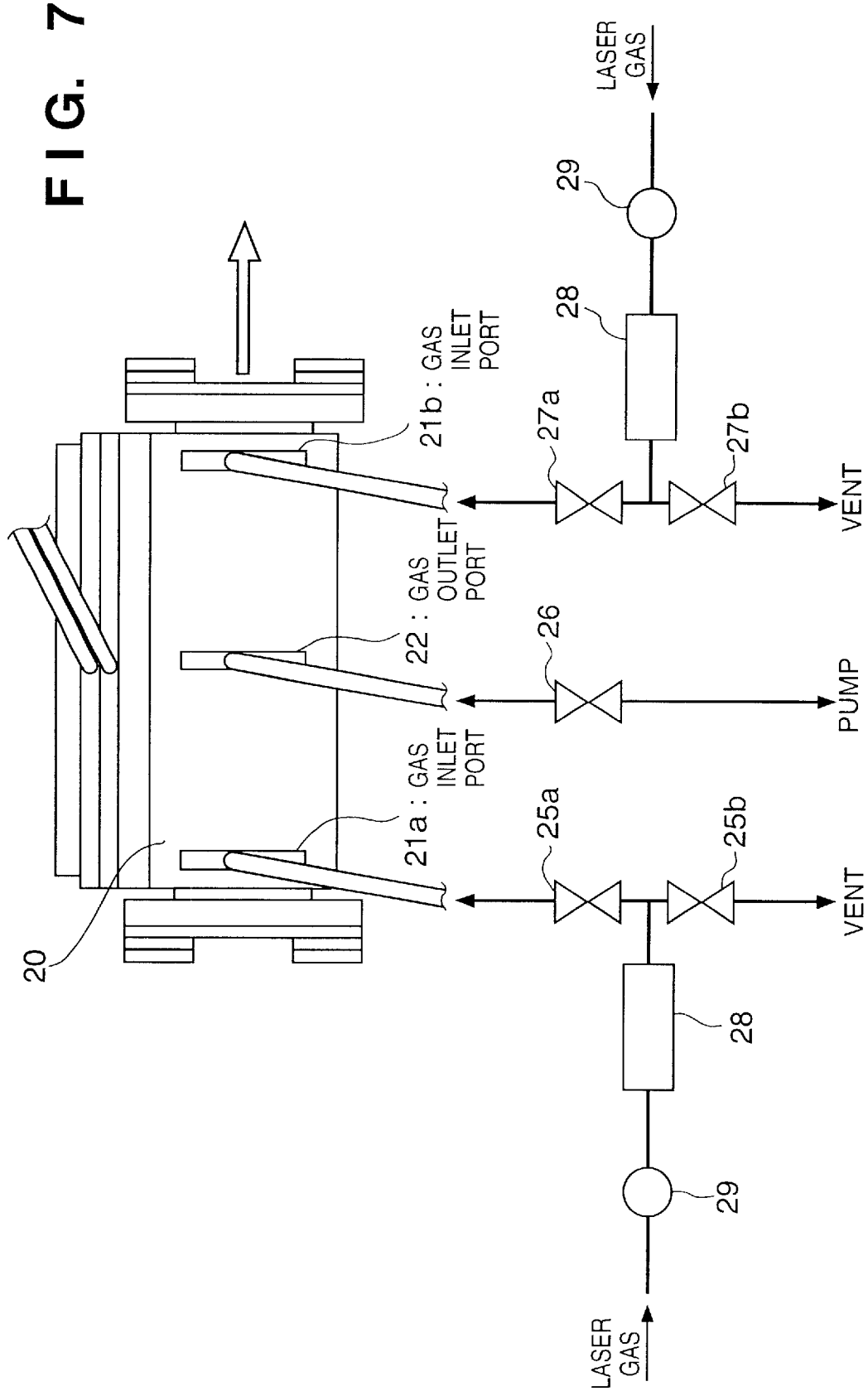
FIG. 7 is a schematic view showing a gas supply system for a laser chamber.

In the present invention, it is preferable to continuously supply the laser gas into the laser chamber. FIG. 7 shows an example of the laser gas supply system that can attain such a gas supply.

In FIG. 7, gas inlet ports 21a and 21b are formed at both ends of a laser chamber 20, and a gas outlet port 22 is formed at substantially the center of the laser chamber 20. Note that the gas outlet port may be connected to a vacuum pump or the like as needed. The laser gas is supplied from the gas inlet ports 21a and 21b at both ends at equal flow rates, and is exhausted from the gas outlet port 22 formed at substantially the center of the chamber. This is because such a port layout also serves to protect the surface of a light reflection plate on the output end. More specifically, since the uppermost surface of the light reflection plate is coated with a thin film of, e.g., a fluoride film, it never reacts with $F_2$ and $F^*$. On the other hand, the gas inlet ports 21a and 21b, and the gas outlet port 22 preferably have a slit-like shape in the direction microwave currents flow.

Also, in FIG. 7, reference numerals 25a, 25b, 26, 27a, and 27b denote valves.

When the laser gas is initially supplied, the valves 25a and 27a are closed and the valves 25b and 27b are opened to purge the interior of pipes from laser gas sources to the vicinities of the valves 25a and 27a. After pipe purging, the valves 25a and 27b are closed, and the valve 26 is opened to supply the laser gas into the laser chamber 20. Once the interior of the laser chamber 20 is purged, the laser gas continues to be supplied to start laser oscillation. Of course, if purging or the like is not required, the valves need not be arranged. In FIG. 7, mass flow controllers (MFCs) or pressure flow controllers (PFCs) 28 control the flow rates. In the present invention, the PFCs are preferable. Reference numeral 29 denotes filters.

In the present invention, to obtain stable continuous oscillation, the $F_2$ concentration in the laser gas falls within the range from 0.1 atomic % to 6 atomic %, and preferably falls within the range from 1 to 6 atomic %. More preferably, the $F_2$ concentration falls within the range from 4 to 6 atomic %.

The laser gas pressure preferably falls within the range from 10 Torr to 15 atm, and more preferably, 1 atm to 15 atm. That is, in the present invention, stable discharge can be obtained even at such a low pressure, and stable continuous oscillation and continuous emission can be obtained. In the conventional laser gas apparatus which does not use the slot-antenna, the laser gas pressure falls within the range from 3 to 10 atm.

In the prior art, when the $F_2$ concentration is raised, since $F_2$ becomes $F^-$ and the electrons vanish to result in unstable discharge, the $F_2$ concentration must be inevitably set at 1% or less (still lower than that in practice), and the pressure must be inevitably set at 3 to 10 atm to compensate for such a low concentration. However, in the present invention, stable discharge is obtained by microwaves even when the $F_2$ concentration is raised and, hence, the gas pressure need not be increased to compensate for the low $F_2$ concentration. Of course, the pressure may be increased if it needs to be increased for some reason.

FIG. 26 shows reaction formulas and reactions that take place in a laser tube of a KrF excimer laser. In FIG. 26, reaction (3) should be noted. As can be seen from (3), $F^-$ and $F_2$ are required to produce KrF* excimers. On the other hand, as can be seen from (4), excimers that have emitted light dissociate into rare gas atoms (Kr) and halogen atoms (F) in the ground state but never become $F_2$ or F– directly required for KrF* excimer production.

In addition, reaction (5) in which halogen atoms (F) produce halogen molecules ($F_2$) is very slow.

From the above findings, it is important to substitute halogen atoms that have emitted light in a discharge space and have returned to the ground state with halogen ions ($F^-$) and halogen molecules ($F_2$)

Laser Tube

A laser tube 40 (FIGS. 8A to 8C and FIGS. 9A and 9B) is a tube that makes up the laser chamber, and has a window portion 44 for introducing microwaves. The laser tube 40 is connected to a waveguide 42 at its window portion 44 side. The interior of the laser tube 40 and that of the waveguide 42 are sealed, and the seal is provided by arranging an insulating plate 41 on the window portion 44 of the laser tube 40. The insulating plate 41 will be described later.

Figure 8A:
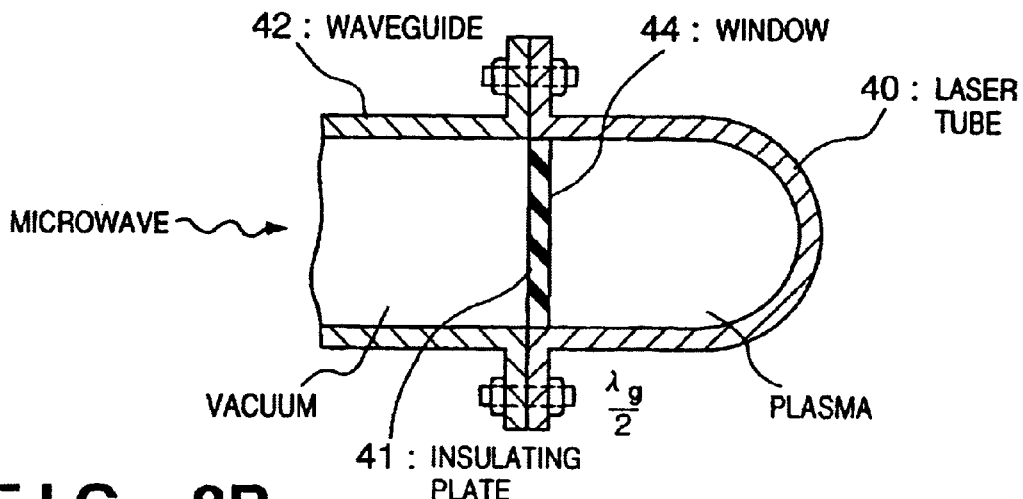
FIGS. 8A to 8C are sectional views each showing an example of the shape of a laser tube.
Figure 8B:
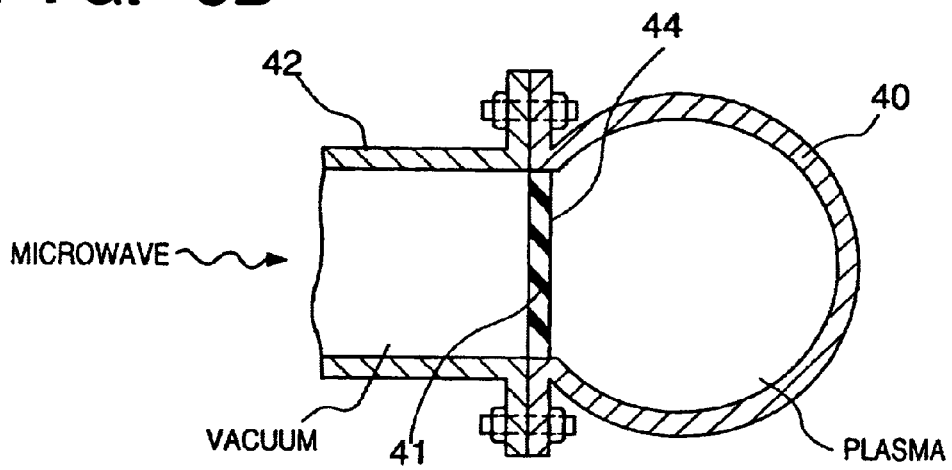
Figure 8C:
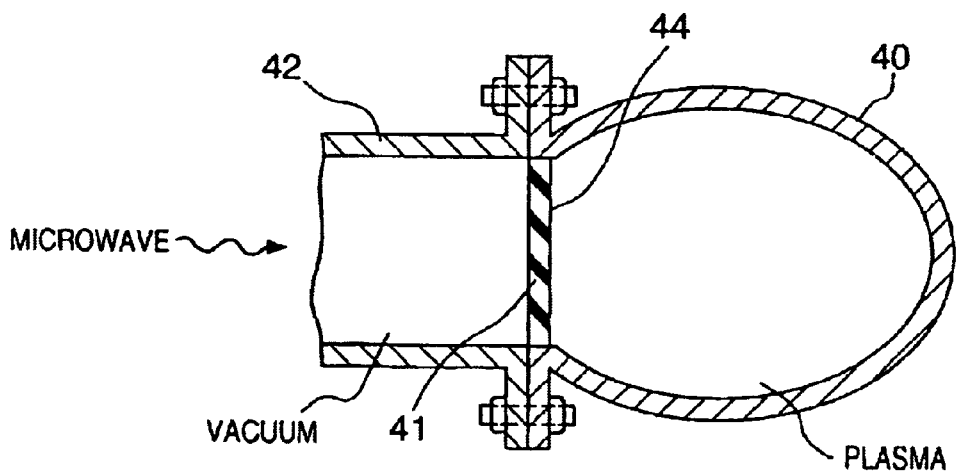

The sectional shape of the terminal end of a plasma excitation portion, i.e., the sectional shape of the laser tube 40 that makes up the laser chamber can be nearly semi-cylindrical shape (or semi-elliptic shape) (FIG. 8A), a cylindrical shape (FIG. 8B), an elliptic shape (FIG. 8C), and the like, as shown in FIGS. 8A to 8C.

Figure 9A:
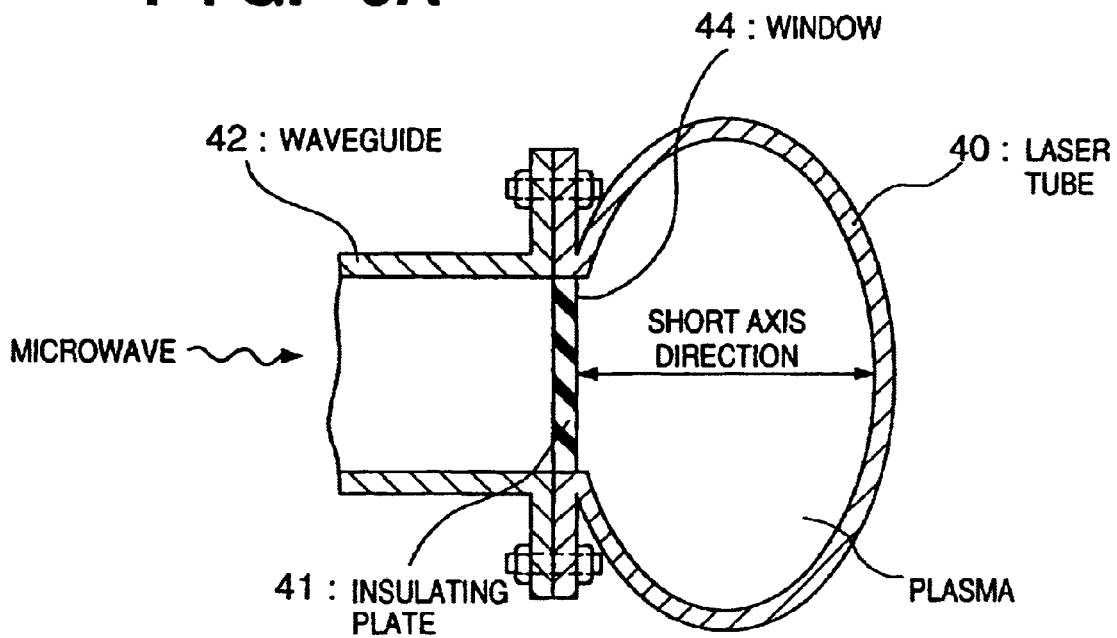
FIGS. 9A and 9B are sectional views showing other examples of the shape of the laser tube.

Furthermore, an elliptic shape shown in FIG. 9A is more preferable. The minor axis direction of this ellipse agrees with the introduction direction of microwaves. Hence, in the case of the sectional shape shown in FIG. 9A, microwaves can be uniformly introduced into the laser gas as the laser medium in the laser tube. Also, a laser beam having a higher density per unit area can be obtained, and can be externally output.

Figure 9B:
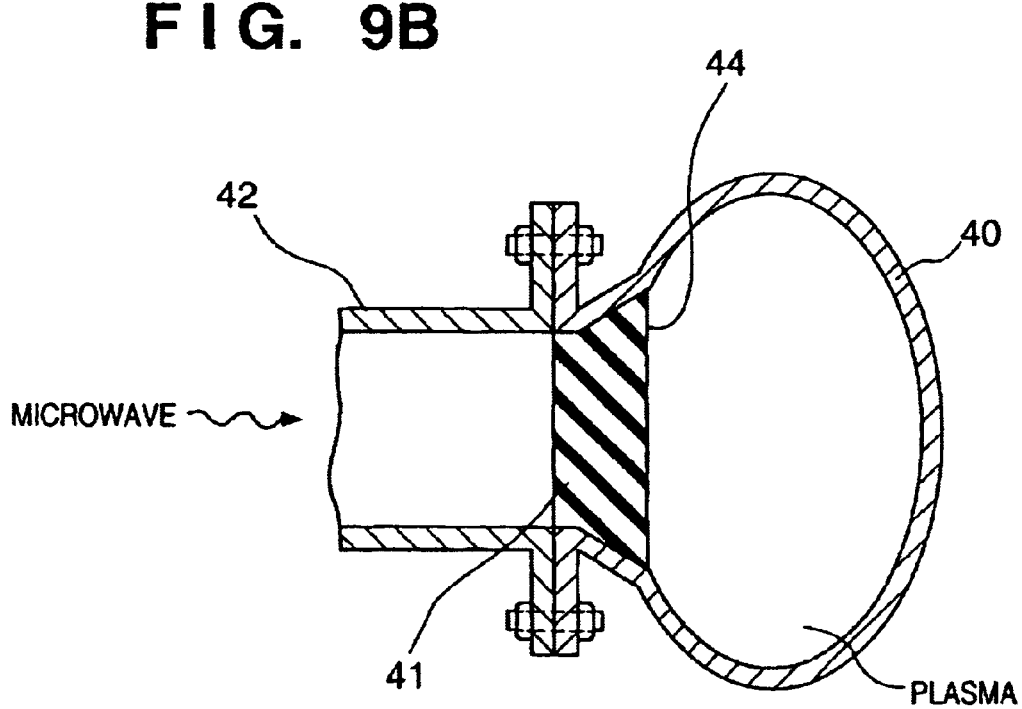

Furthermore, the window portion 44 of the laser tube 40 may be tapered wider toward the laser tube 40 side, as shown in FIG. 9B. Note that it may be tapered narrower toward the laser tube 40 side.

Connections between the laser tube 40 and the waveguide 42 can be accomplished by, e.g., sealed fastening by forming flange portions on them, as shown in FIGS. 8A to 8C or FIGS. 9A and 9B.

In the present invention, no parts such as electrodes need be arranged inside the laser tube 40. More specifically, no electrodes or the like need be assembled into the laser tube 40 later. Hence, the insulating plate 41 may be attached in advance to the laser tube 40 depending on the manufacturing process. The insulating plate 41 may be attached by, e.g., shrink fit. In the case of FIG. 9B, the insulating plate 41 may be fitted from the inner side of the laser tube 40.

Note that the laser tube 40 constitutes the laser chamber, and its uppermost surface consists of a fluoride to suppress reactions with $F^*$, KrF*, and ArF*, as described above.

When the main body of the laser tube 40 consists of a metal, easy manufacture is assured, and cooling efficiency can be improved. In particular, in order to prevent changes in optical resonator length due to changes in temperature, a metal having nearly zero thermal expansion coefficient is preferably used. In addition, a metal such as copper or silver having a high electric conductance is preferably formed on the inner surface of the laser tube by, e.g., plating, to have a thickness at least larger than the skin depth of microwaves.

As a preferred embodiment of the insulating plate 41, for example, at least the surface that contacts the plasma (the surface on the laser tube 40 side) is coated with a multilayered film (e.g., $SiO_2$, $Al_2O_3$, $CaF_2$, $MgF_2$ film, or the like), and its uppermost surface is formed with a thin fluoride film (e.g., $CaF_2$, $MgF_2$, $LaF_2$, or other thin fluoride films).

Furthermore, the insulating plate 41 must satisfy the following conditions for its materials: its materials have very small losses with respect to microwaves supplied, are mechanically robust, are insoluble in water, and so on.

The thickness of the insulating plate 41 need only correspond to integer multiples or substantially integer multiples of half the wavelength (intra-tube wavelength) of microwaves.

Microwaves

In the present invention, microwaves are used as an excitation means of the laser gas. Using the microwaves, the laser gas can be continuously excited and continuous emission is feasible.

As a microwave supply source, for example, a gyrotron (tradename) can be used. Hereafter, although the numerical example about gyrotron is mainly shown, of course, the same is said of a magnetron.

The frequency and electric power of the microwaves can be appropriately determined depending on the partial pressures of component gases of the laser gas, and the like. In general, the frequency of the microwaves preferably falls within the range from 1 GHz to 50 GHz, more preferably, 2 to 40 GHz, and most preferably, 2 to 35 GHz. The electric power of the microwaves preferably falls within the range from several hundred W to several kW.

If the frequency, ω, of excitation microwaves is, e.g., 35 GHz, a gas pressure at which the collision frequency ωc of electrons to Ne atoms, which is determined by the collision sectional area of Ne as the main body of a plasma excitation gas to electrons, equals the excitation microwave frequency, is 160 Torr.

In this state, the plasma excitation efficiency based on identical electric power is highest.

When the gas pressure of $Kr/Ne/F_2$ (3%/92%/5%) is set at the atmospheric pressure (760 Torr), the collision frequency is about 4.5 times the frequency of excitation microwaves, and electrons collide against Ne atoms 4.5 times during one cycle of the excitation frequency.

Accordingly, this state satisfies the Resistive Plasma condition, and the skin depth determined by the equation below equals a depth at which plasma excitation takes place efficiently:

$$\delta=(2/\omega\mu_0\sigma)^{1/2}$$

where ω is the angular frequency of microwaves, $\mu_0$ is the vacuum magnetic permeability, and σ is the conductivity of the plasma.

When the frequency of the microwaves is 35 GHz, the gas pressure is 160 Torr, and the electron density is $10^{14}$ cm$^{-3}$, we have:

$\omega=2\pi\times35\times10^9$ $\mu_0=4\pi\times10^{-7}$ $\sigma=12.8$.

Hence, the skin depth is:

$\delta=750$ μm.

For example, microwaves of 35 GHz are induced using a 5 mm high, 10 cm wide waveguide.

The waveguide portion and the plasma excitation portion are hermetically sealed by an insulating plate of, e.g., $SiO_2$, $CaF_2$, or the like. The thickness of the insulating plate is set at substantially integer multiples of half the intra-tube wavelength $\lambda_g$ also in consideration of the dielectric constant of the insulating plate.

Accordingly, when the frequency of microwaves is 17.5 GHz, the frequency equals the collision frequency at a gas pressure of 80 Torr. If the plasma frequency is 35 GHz, the electron density at that time is $5\times10^{13}$ cm$^{-13}$. When a gas plasma at about the atmospheric pressure (1 atm) is produced from a gas pressure of 70 to 80 Torr using electric power ranging from 100 W to 1 kW at 35 GHz, F*, KrF*, and ArF* having a density on the order of $10^{14}$ cm$^{-13}$ can be reliably realized.

With skin depth $\delta=(2/\omega\mu\sigma)^{1/2}$, $\sigma=ne\mu$, and $\mu=e\tau/m$, according to experimental values, an average electron energy (an electron temperature) 2 eV, electron density n=$4\times10^{12}$, and skin depth δ=3 mm at f=2.45 GHz and pressure P=0.5 Torr are obtained. Upon calculation based on these values, according to the above equations, the following values are assumed: average electron energy (an electron temperature) GHz: 4 to 5 eV; electron density: n=$1\times10^{15}$; at f=2.45 GHz and pressure: P=760 Torr; skin depth: δ=1 mm. Consider that a plasma is excited from the upper and lower sides. In this case, skin depth δ=2 mm. Obviously, therefore, a gain area in which the fundamental mode of the excimer laser can satisfactorily rise can be ensured.

In addition, the average electron energy (an electron temperature) high enough to cause laser oscillation is assumed to be amount 3 to 5 eV in a KrF excimer laser, and hence the condition for microwaves which is provided by the present invention suffices.

In addition, the applied power density required to properly oscillate the excimer laser is about 100 kW/cm$^3$. Assuming a resonator length of about 30 cm, for example, when a pulse oscillation is considered, a commercially available magnetron with a peak power of 3 MW can be satisfactorily used as a microwave source.

Since skin depth $\delta=(2/\omega\mu\sigma)^{1/2}$ is proportional to $1/f^{1/2}$, the frequency of microwaves may be decreased in order to increase the skin depth. If, however, the frequency of microwaves decreases, the waveguide tends to become larger. In consideration of these points, the frequency of microwaves is preferably set to f=2.45 GHz.

In supplying microwaves, the surfaces of the waveguide and insulating plate, which contact the plasma excitation portion, preferably comprise a reflection-free plate with respect to a wavelength of 248 nm or the like.

Figure 10:
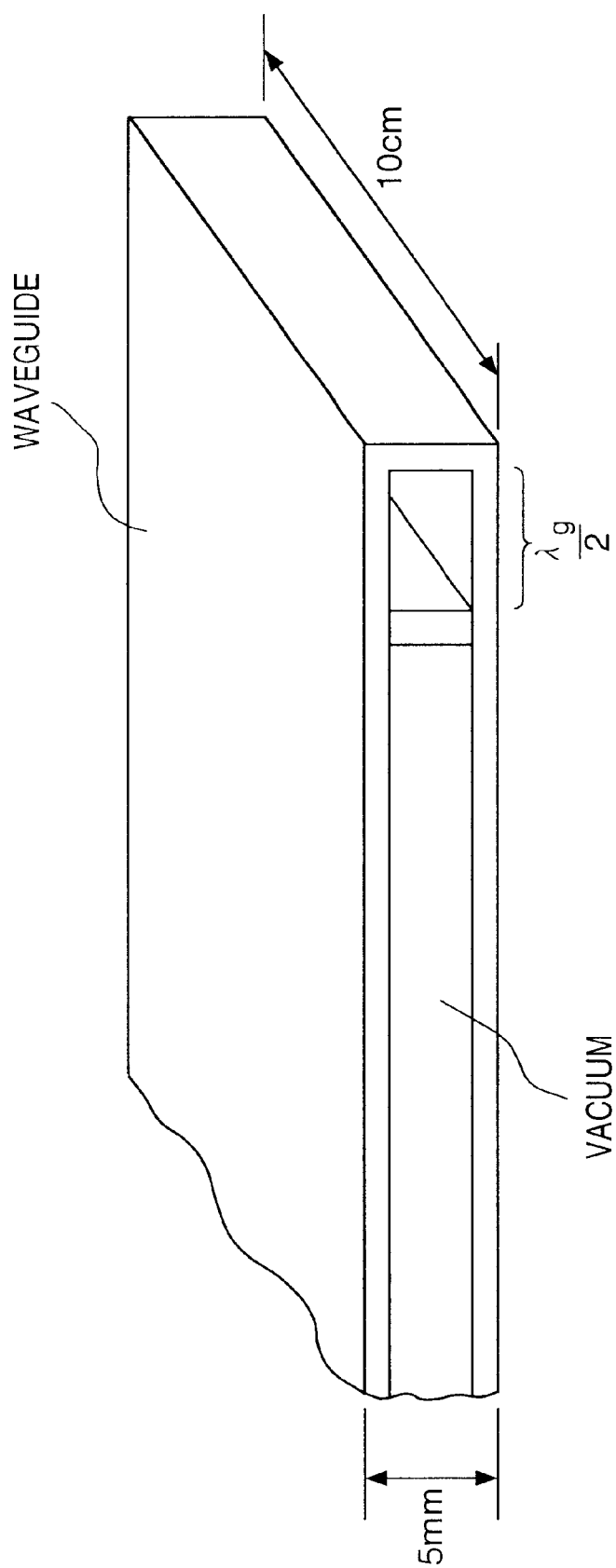
FIG. 10 is a perspective view showing the gap between the terminal end of a waveguide and an insulating plate.
Figure 11B:
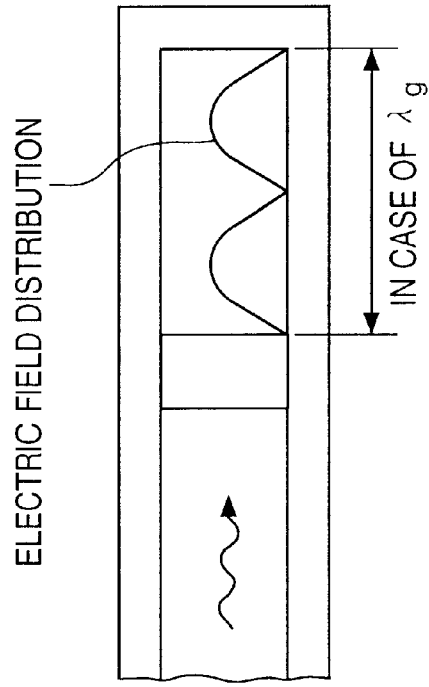
FIGS. 11A and 11B are sectional views showing the gap between the terminal end of the waveguide and the insulating plate.
Figure 11A:
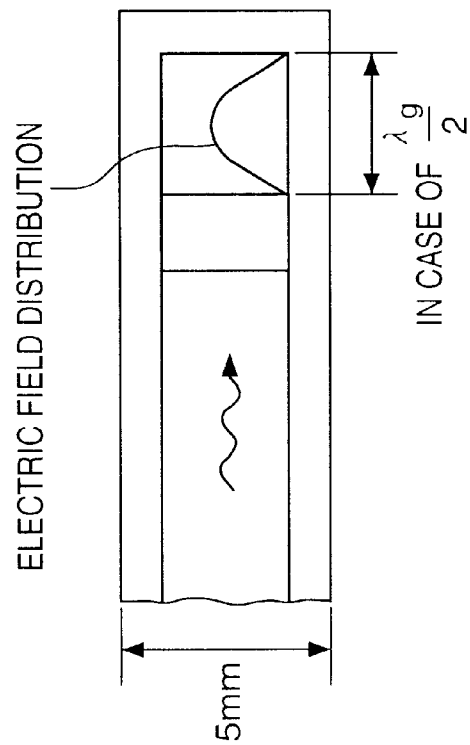

On the other hand, the gap between the waveguide and the insulating plate may be set at $\lambda_g/2$, as shown in FIG. 10 or 11A, or $\lambda_g$, as shown in FIG. 11B. Alternatively, the gap may be set at $3\lambda_g/2$.

Note that the interior of the waveguide is preferably set in a vacuum state so as to prevent discharge. If a degree of vacuum of $10^{-4}$ Torr or less is assured, discharge can be prevented.

Note that the inner surface of the waveguide 42, which is in the vicinity of the contact portion with the laser tube 40, preferably comprises a reflection-free surface as in the inner surface of the laser tube 40. This is to prevent light reflected by the inner surface of the waveguide 42 from returning into the laser tube 40.

Figure 12:
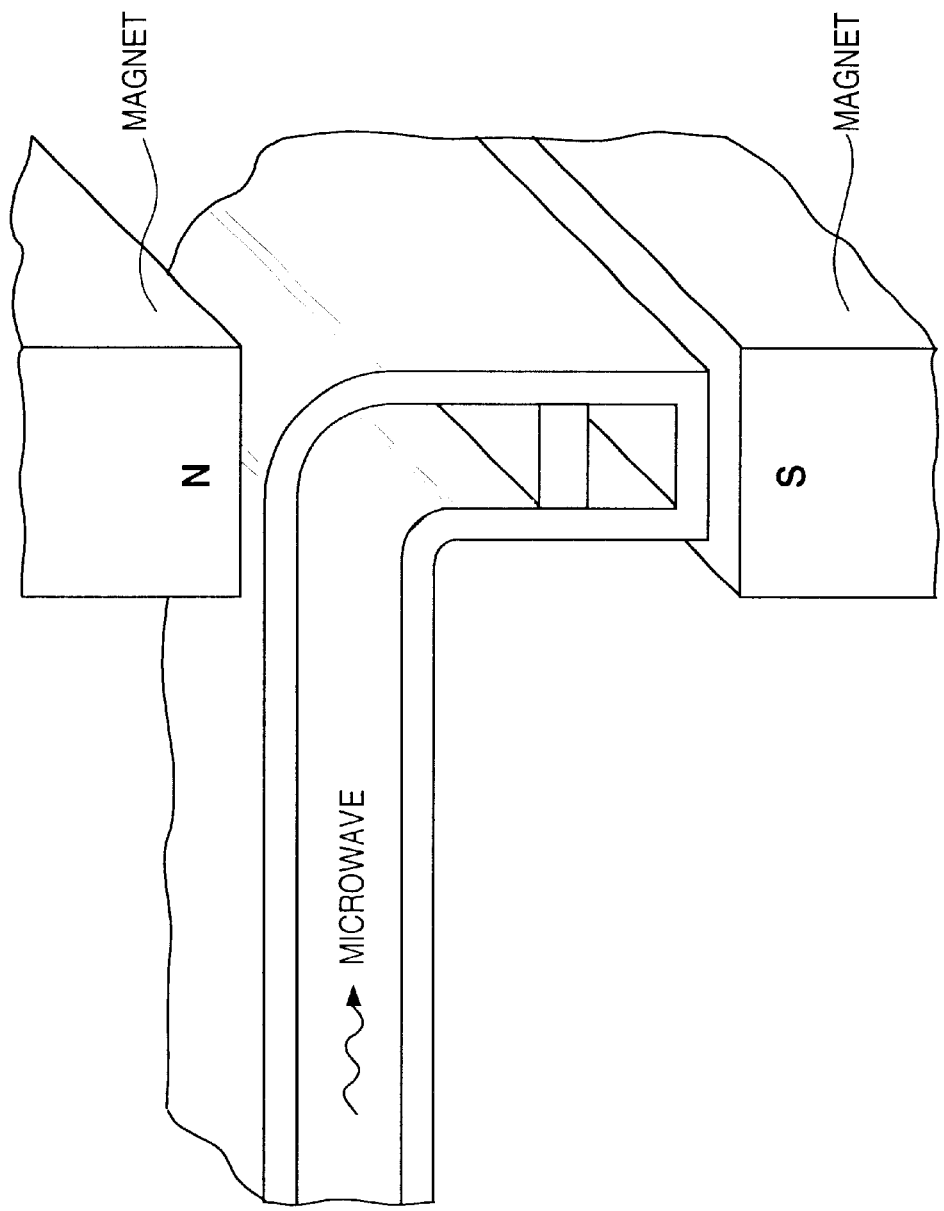
FIG. 12 is a perspective view showing application of a magnetic field.

Furthermore, an electromagnet or permanent magnet preferably applies a magnetic field to achieve stable high density discharge, as shown in FIG. 12.

Microwave Introduction Means

FIGS. 13A and 13B to 18 show examples of the structure of the microwave introduction means.

Figure 13A:
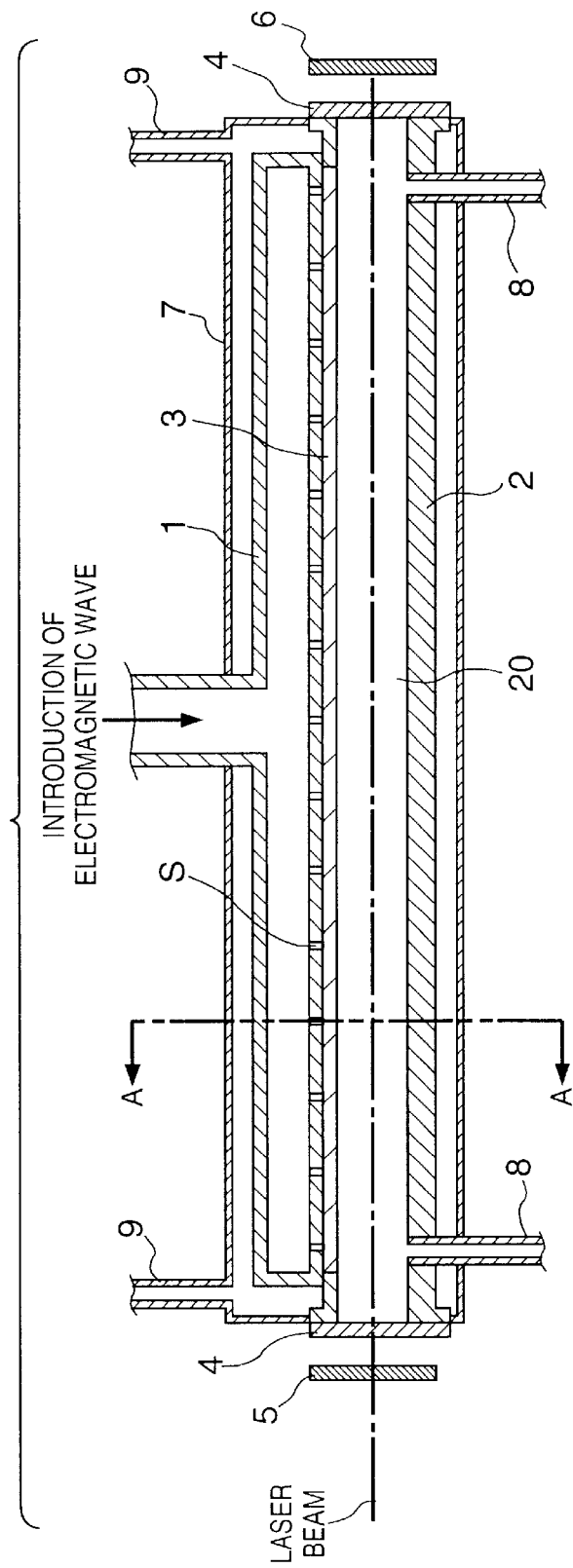
FIGS. 13A and 13B are respectively a cross-sectional view and an A—A sectional view of an example of a continuous emission excimer laser oscillation apparatus having a microwave supply device.
Figure 13B:
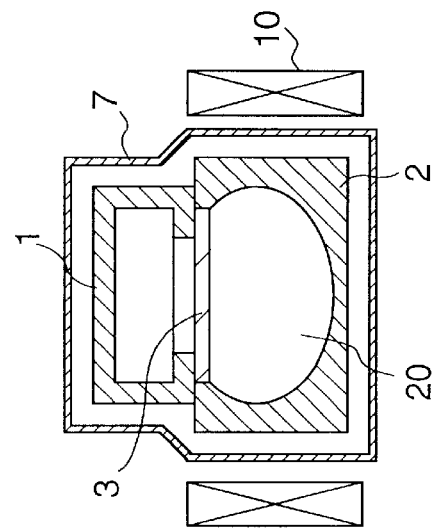

In the example shows in FIGS. 13A and 13B, a waveguide 1 that constitutes the microwave introduction means is a slot waveguide having a plurality of slots S. The slog waveguide 1 is connected to the outer surface of a laser tube 2 to extend in a direction parallel to its axial direction. Electromagnetic waves of several GHz to several tens of GHz are introduced from an upper portion of the slot waveguide 1, and propagate along the waveguide 1.

A large number of elongated slots S are formed in the lower surface (FIGS. 13A and 13B) of the slot waveguide 1, as shown in FIGS. 14A to 14D, and the electromagnetic waves are emitted outside the waveguide 1 via the slots S while propagating along the waveguide 1.

The electromagnetic waves emitted from the slots S are introduced into the laser tube 2 via a dielectric plate 3, and ionize a laser gas in the laser tube 2 to produce a plasma. A magnetic field generator 10 comprises a permanent magnet or electromagnet for applying a magnetic field in the direction perpendicular to the laser tube 2. As the permanent magnet used, an iron-vanadium magnet or Nd·Fe·B magnet having a strong magnetic force is suitable.

The magnetic field introduced into the laser tube 2 can trap electrons in the plasma to eliminate losses on the wall surface, and a higher-density plasma can be obtained. When the magnetic field strength is appropriately selected, a still higher-density plasma can be obtained by electron cyclotron resonance.

Of course, when a plasma having a sufficiently high density is obtained without applying any magnetic field, the need for the magnetic field generator 10 can be obviated.

Kr, Ne, and $F_2$ gases are supplied/exhausted into/from the laser tube 2 via, e.g., gas inlet ports 8. If the gases need not be exchanged upon generation of a plasma, since the gases need only be sealed in the laser tube 2, the gas inlet ports 8 are not required. In the plasma, radicals such as KrF or the like having a lifetime of about 10 nsec are continuously generated, and emit light when they dissociate into Kr and F. This light promotes induced emission while traveling back and forth in an optical resonator formed by an output-side mirror 5 and a reflection-side mirror 6, and is amplified by induced emission. The output-side mirror 5 has a reflectance of 90% or higher, and light transmitted through this output-side mirror is externally output as a laser beam.

In the example shown in FIGS. 13A and 13B, an aluminum alloy can be used as the material for the laser tube main body. In order to improve efficiency, a dielectric multilayered film is formed on the inner surfaces of the laser main body and the dielectric plate 3, so the reflectance at the oscillator length is zero (reflection-free).

In order to cool the laser tube 2 and the waveguide 1, a refrigerant such as cooling water, air, an $N_2$ gas, or the like can be supplied between a refrigerant chamber 7 having a cooling water inlet portion 9, and these members. The slot waveguide 1 can be set in a vacuum state to prevent discharge therein.

FIGS. 14A to 14D are bottom views of the slot waveguide 1.

Figure 14A:
FIGS. 14A to 14D are bottom views of a waveguide 1 in FIG. 13A.

In FIG. 14A, slots S pointing in a direction perpendicular to the axis of the waveguide 1 are arranged at intervals equal to the wavelength of an electromagnetic wave in the waveguide 1. The individual slots emit in-phase, linearly polarized electromagnetic waves, which are polarized in the axial direction of the waveguide.

Figure 14B:
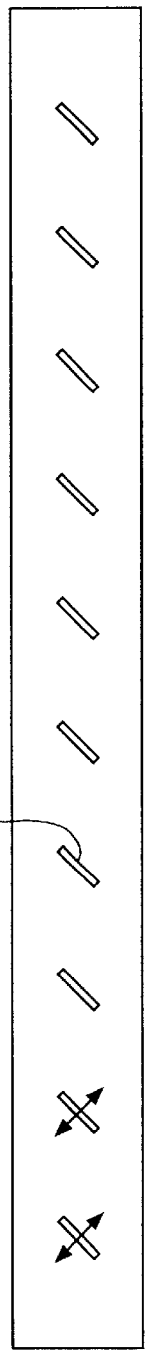

In FIG. 14B, slots tilted 45° from the axis of the waveguide are arranged at intervals equal to the wavelength of an electromagnetic wave in the waveguide. The individual slots emit in-phase, linearly polarized electromagnetic waves, which are polarized in a direction tilted 45° with respect to the axial direction of the waveguide.

Figure 14C:
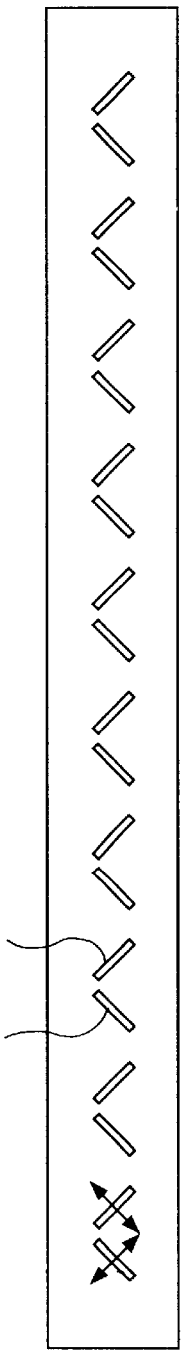

In FIG. 14C, pairs of orthogonal slots which are tilted 45° from the axis of the waveguide are arranged at intervals equal to the wavelength of an electromagnetic wave in the waveguide. The individual slots emit in-phase, circularly polarized electromagnetic waves.

Figure 14D:
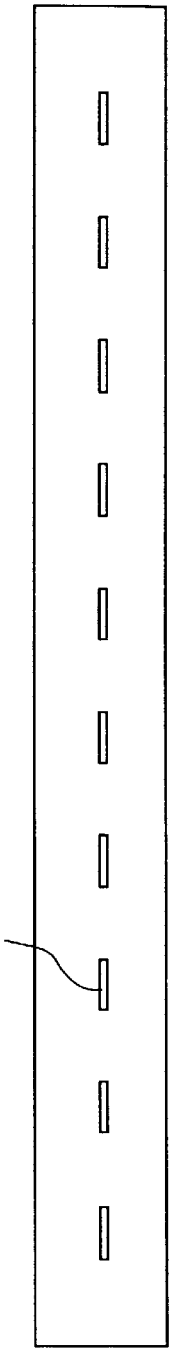

In FIG. 14D, slots S pointing in a direction parallel to the axis of the waveguide 1 are arranged at intervals equal to the wavelength of an electromagnetic wave in the waveguide 1. The individual slots emit in-phase, linearly polarized electromagnetic waves, which are polarized in a direction tilted 90 degrees with respect to the axial direction of the waveguide.

The length of these slots is determined in correspondence with the electromagnetic wave intensity distribution in the waveguide, so that the intensities of electromagnetic waves emitted from the individual slots are nearly equal to each other. The angle of the slots and the interval between adjacent slots are not limited to those described above.

Figure 15A:
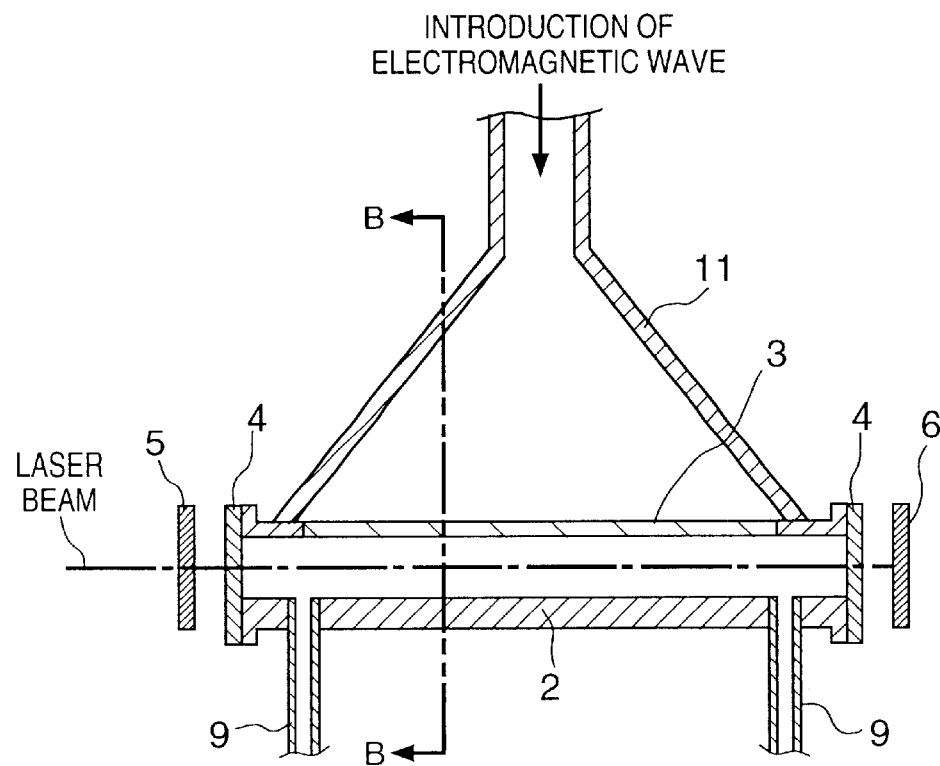
FIGS. 15A and 15B are respectively a cross-sectional view and a B—B sectional view of a continuous emission excimer laser oscillation apparatus having a microwave supply device.
Figure 15B:
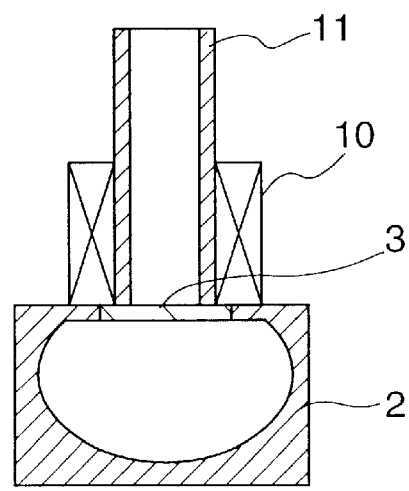

In the structure shown in FIGS. 15A and 15B (FIG. 15B is a sectional view of a portion B—B in FIG. 15A), an electromagnetic wave of several GHz to several tens of GHz is introduced from the upper portion of a tapered waveguide 11, is diverged by a tapered portion, and is then introduced into the laser tube 2 via the dielectric plate 3. In the example shown in FIGS. 15A and 15B, an electric field propagates as a TE10 mode, near the electromagnetic wave introduction portion of the tapered waveguide 11. Other arrangements are the same as those shown in FIG. 13.

FIGS. 16A, 16B, 17A, and 17B show examples wherein microwaves are introduced as surface waves. In the structure shown in FIGS. 16A and 16B (FIG. 16B is a sectional view of a portion C—C in FIG. 16A), an electromagnetic wave of several GHz to several tens of GHz is introduced from an upper portion of a waveguide 12 with a gap, which uses a cylindrical induction tube, and propagates in the tube with an electric field parallel to the drawing. An electric field in the tube axis direction of an induction tube 14 is applied from a gap portion of the waveguide 12 with the gap. The introduced microwaves becomes surface waves which propagate from the gap portion in the right and left axis directions in the induction tube 14. Electrons in the plasma are accelerated by this surface wave electric field, thus maintaining a high-density plasma.

Since surface waves which attenuate slowly and have an identical mode propagate from the central portion of the laser tube, no local intensity distribution of the microwave electric field is formed. Accordingly, since uniform plasma excitation takes place on the plasma surface, a high-density plasma can be efficiently generated. Since the microwave electric field need only be applied to the gap portion alone, the microwave circuit is very simple. This plasma generation method is most suitable for oscillating a thin laser since a long, high-density plasma which is as thin as several mm can be efficiently generated. In the example shown in FIGS. 13A and 13B, the induction tube 14 consists of $CaF_2$. A movable short-circuiting plate 13 is arranged to suppress reflection to an electromagnetic wave generator by adjusting the short-circuiting position, but need not be movable. When the frequency of an electromagnetic wave is high and the waveguide has a sufficiently small size, the gap portion of the waveguide is not required. The magnetic field generator 10 comprises a permanent magnet or electromagnet, and generates a magnetic field in the tube axis direction of the induction tube 14. Other arrangements are the same as those in FIGS. 13A and 13B.

Figure 17A:
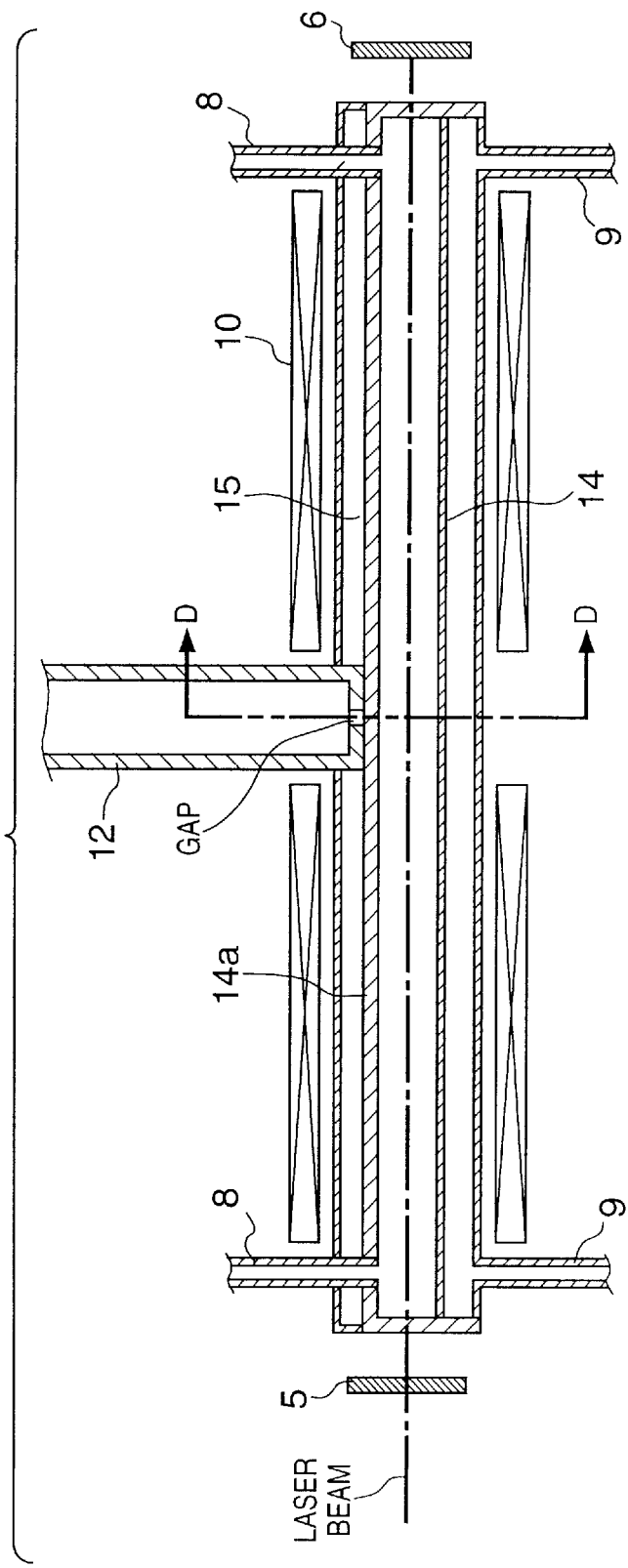
FIGS. 17A and 17B are cross-sectional views of another continuous emission excimer laser oscillation apparatus having a microwave supply device.
Figure 17B:
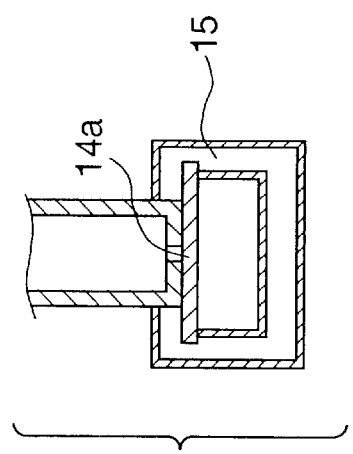

FIGS. 17A and 17B (FIG. 17B is a sectional view of a portion D—D in FIG. 17A) show an example wherein an induction plate 14a is used. This structure is the same as that using a cylindrical induction tube in principle and is suitable for generating a wide, thin plasma. Since the portion below the plasma does not contribute to plasma generation, a high-speed gas flow in a direction perpendicular to the laser tube axis is easy to obtain in this portion.

Figure 19:
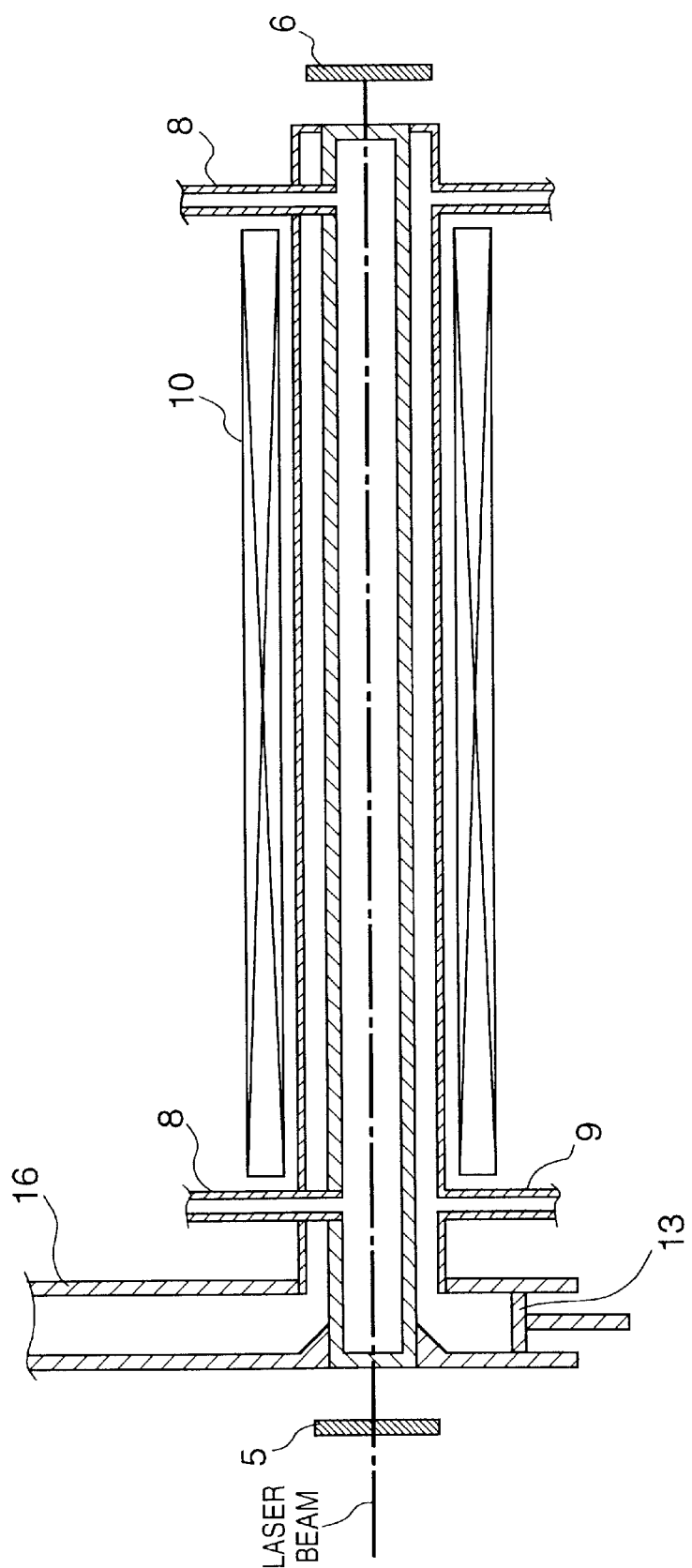
FIG. 19 is a cross-sectional view of a continuous emission excimer laser oscillation apparatus having a microwave supply device.

In the structure shown in FIG. 19, an electromagnetic wave of several GHz to several tens of GHz is introduced from an upper portion of a coaxial conversion waveguide 16, and propagates in the tube with an electric field parallel to the drawing. This electromagnetic wave propagates while changing its mode to an electromagnetic wave in the right-and-left directions, that propagates between a shield plate 15 and the plasma in the induction tube 14. A high-density plasma is generated by RF currents that flow on the plasma surface. Other arrangements are the same as those shown ion FIGS. 13A and 13B to 17A and 17B.

In the structure shown in FIG. 18, an electromagnetic wave of several GHz to several tens of GHz is introduced from the upper portion of the coaxial conversion waveguide 16, and propagates in the tube with an electric field parallel to the drawing. This electromagnetic wave propagates while changing its mode to an electromagnetic wave in the right and left direction, that propagates between the shield plate 15 and the plasma in the induction tube 14. Other arrangements are the same as those in FIG. 17 and FIG. 19.

Shape of Microwave Induction Means, etc.

In a stable resonator, a certain permanent mode is formed, and a mode having the smallest beam spot radius is the TEM00 (mode) having a Gaussian distribution. In order to build a resonator, a space that allows at least the fundamental mode to propagate without any losses is required. The beam spot radius of the fundamental mode is defined by the wavelength of the laser beam, the length of the resonator, and the radius of curvature of the mirror of the resonator, and can be expressed using L: the resonator length, R: the radius curvature of the mirror, and g: a parameter (g=1−L/R), as shown in FIG. 29A.

Figure 29A:
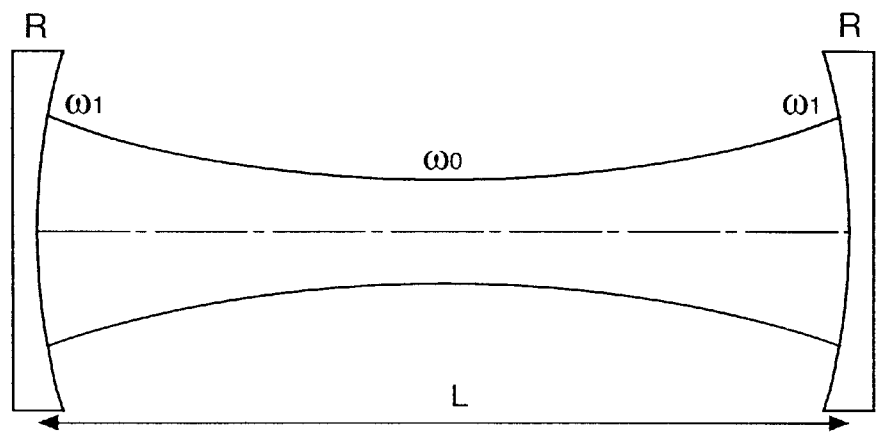
FIGS. 29A and 29B are graphs showing changes in beam diameter.
Figure 29B:
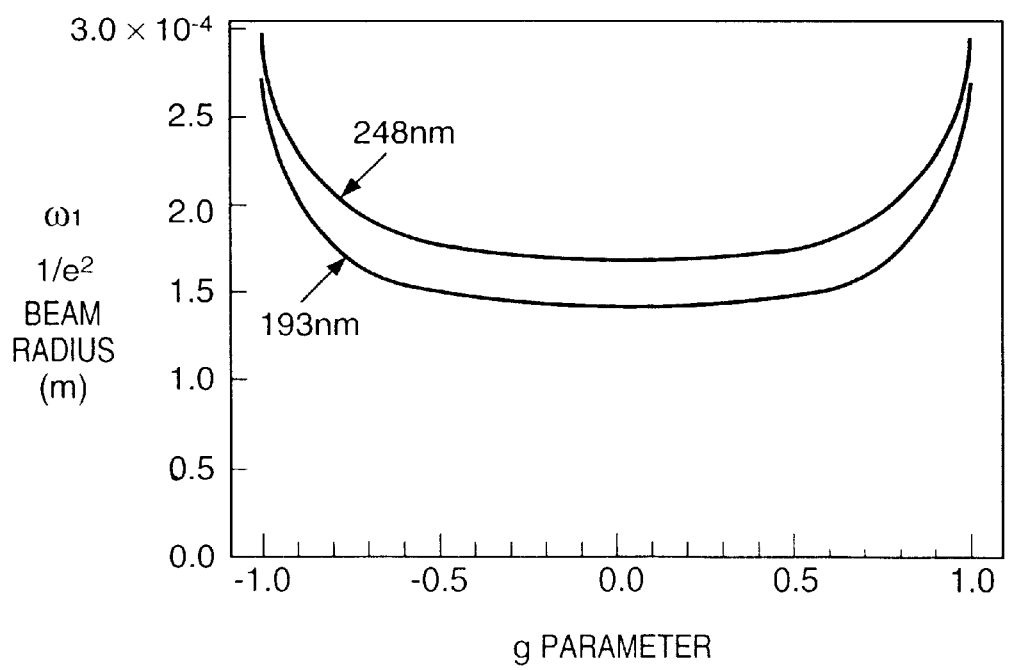

FIG. 29B shows the calculation result of the $1/e^2$ beam spot radius of the fundamental mode on the mirror (resonator end portion) of a symmetrical stable resonator while assuming the resonator length L=200 mm. The abscissa plots the g parameter.

As shown in FIGS. 29A and 29B, the beam spot radius changes in the optical axis direction. Therefore, when a stable resonator is used, a problem arises: a high-gain region, i.e., a region with a high plasma density immediately below the microwave introduction portion of the laser chamber is not included in the optical path.

To solve this problem, when the microwave introduction means on the laser chamber side is deformed to have a shape corresponding to the beam spot radius, the high-gain region, i.e., the region with a high plasma density immediately below the microwave introduction portion of the laser chamber can be included in the optical path.

Figure 30A:
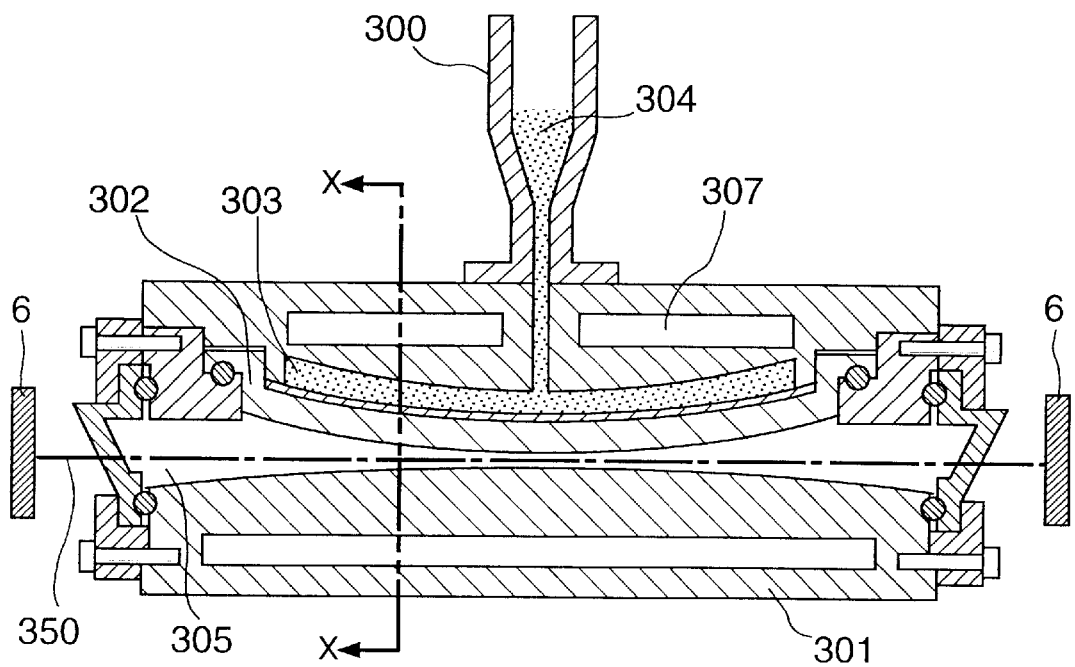
FIGS. 30A and 30B are sectional views showing a laser oscillation apparatus.

FIG. 30A shows this example. In FIG. 30A, the microwave introduction means is made up of a waveguide consisting of an introduction portion 300 and the slot plate 303 having slots (not shown in FIG. 30A), and the dielectric plate 302. The distance between the dielectric plate 302 and the optical axis 350 of the resonator is changed in correspondence with changes, in the direction of the optical axis 350, in beam spot radius in a direction perpendicular to the optical axis 350. More specifically, the distance between the dielectric plate 302 and the beam outer periphery is made constant. Note that reference numeral 304 denotes an isolator, e.g., AlN filled in the waveguide to facilitate introduction of microwaves and to attain a size reduction of the waveguide.

Figure 30B:
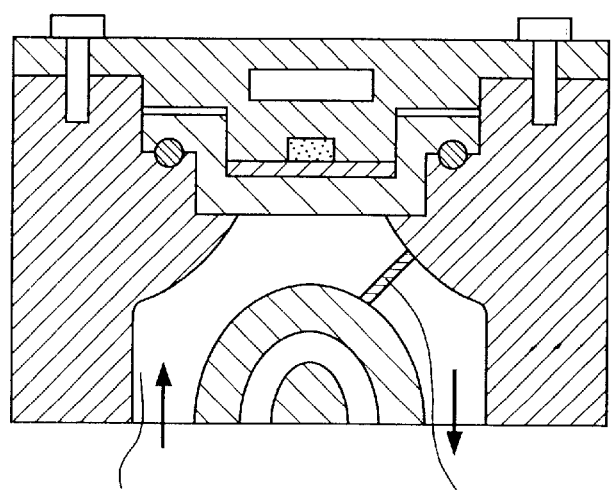

When the shape of the dielectric plate 302 on the laser chamber 305 side is defined not by a plane but by a curved surface, as shown in FIG. 30A, the laser gas flow is disturbed (turbulent flow), resulting in diffraction losses. To avoid this, as shown in FIG. 30B (FIG. 30B is a sectional view of a portion X—X in FIG. 30A), a baffle plate (means for shaping the laser gas flow into a laminar flow) 306 is preferably arranged at the laser gas inlet port. This plate can form the laser gas flow into a uniform laminar flow.

The rectification plate 306 also has a function of confining the generated plasma in the laser chamber 305. Note that another baffle plate may be arranged at the downstream side to obtain such a function.

The laminar flow can be easily realized using the baffle plate 306 which has a conductance smaller than that in the laser chamber.

As the baffle plate, a plate having holes in the form of a honeycomb like a shower head or a plate with many slits is preferably used.

Near the center of the laser chamber the slits are preferably formed at higher density than those formed at the peripheral portion, since the gas can be uniformly flowed at high speed.

At least the surface of the rectification plate 306 consists of a fluoride such as $AlF_3$, $MgF_2$, or the like.

Figure 31A:
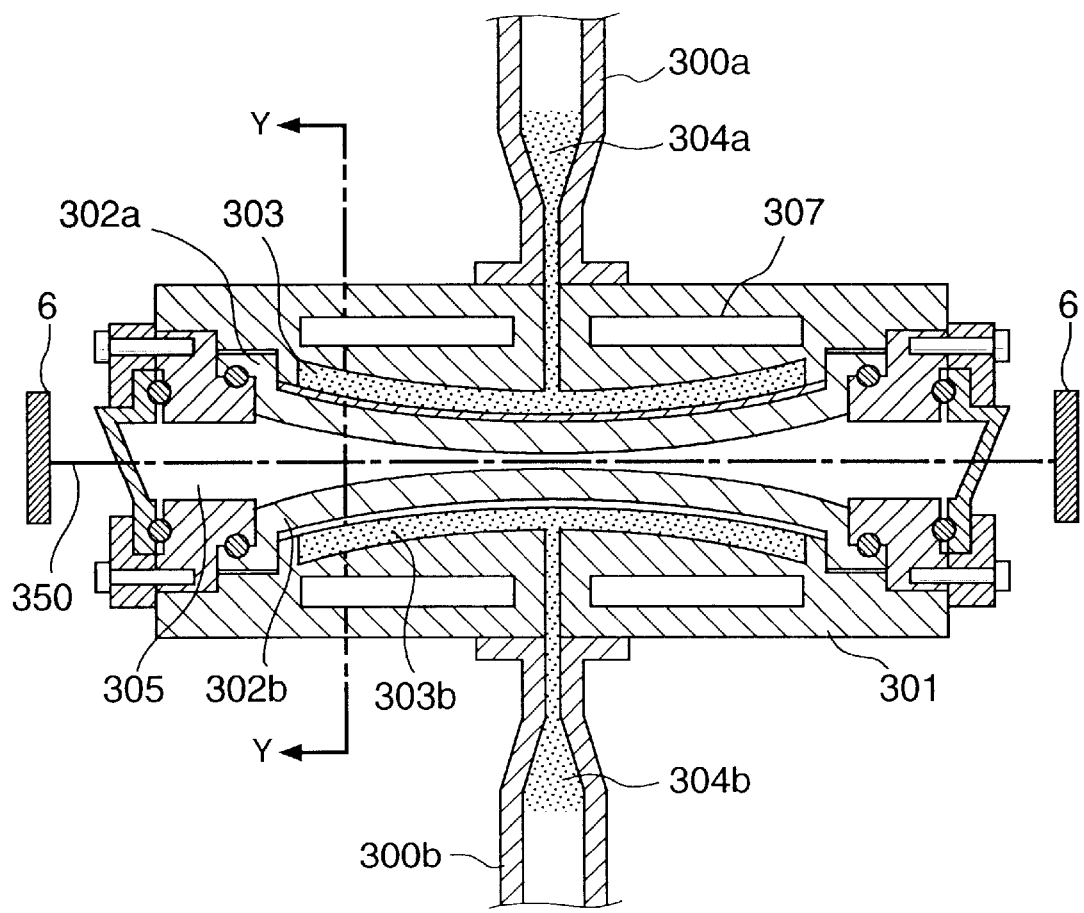
FIGS. 31A and 31B are sectional views showing a laser oscillation apparatus.
Figure 31B:
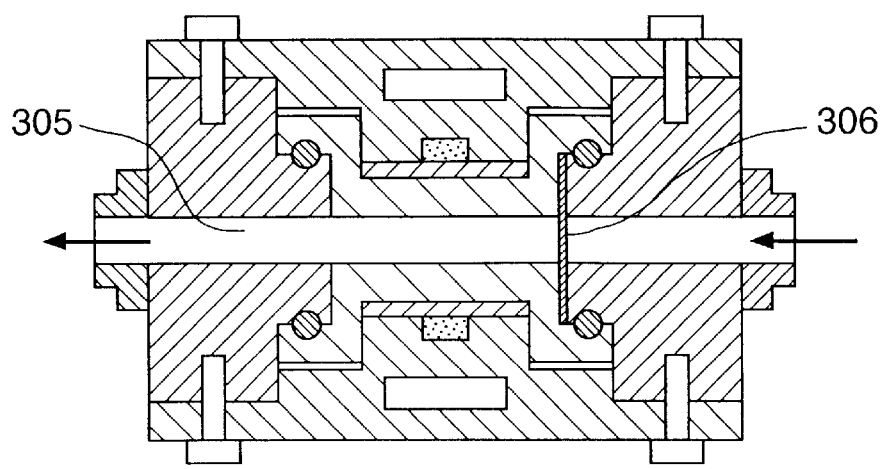

FIGS. 30A and 30B show a case wherein a single microwave introduction means is arranged. Alternatively, as shown in FIGS. 31A and 31B (FIG. 31B is a sectional view of a portion X—X in FIG. 31A), two microwave introduction means may be arranged to be symmetrical about the optical axis 350. When the two means are symmetrically arranged, a gain can be obtained twice as much as that obtained by the signal means.

Note that the technique for deforming the shape of the microwave introduction means on the laser chamber side in correspondence with the beam outer peripheral shape is particularly effective in a continuous emission excimer laser oscillation apparatus, and can also be applied to other laser oscillation apparatuses that generate a plasma by introducing microwaves.

On the other hand, when the microwave introduction means is constituted by the waveguide consisting of the introduction portion 300 and the slot plate 303, and the dielectric plate 302, as shown in FIGS. 30A, 30B, 31A, and 31B, the dielectric plate 302 requires a complicated working/attachment process. Also, in terms of easy working/attachment, the dielectric plate 302 must be thick to some extent.

Figure 32A:
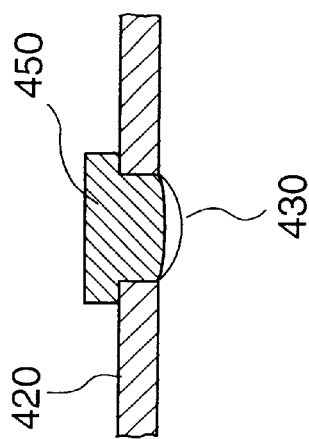
FIGS. 32A to 32C are schematic views showing the vicinities of a slot portion.
Figure 32B:
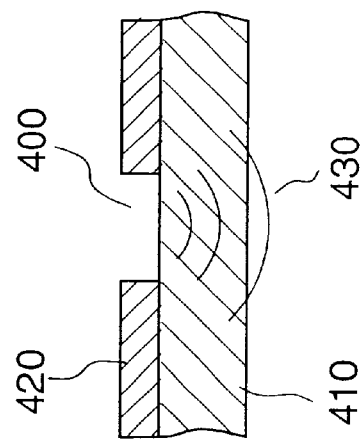

When a dielectric plate 410 is thick, as shown in FIG. 32A, microwaves diverge in a laser chamber 430. Accordingly, large electric power is required to obtain a high density plasma. FIG. 32B shows a case wherein the dielectric plate 410 is thinner than that in FIG. 32A, and the divergence of microwaves is smaller than that in FIG. 32A.

Figure 32C:
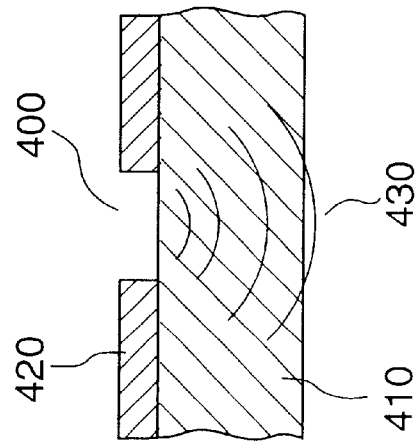
Figure 33:
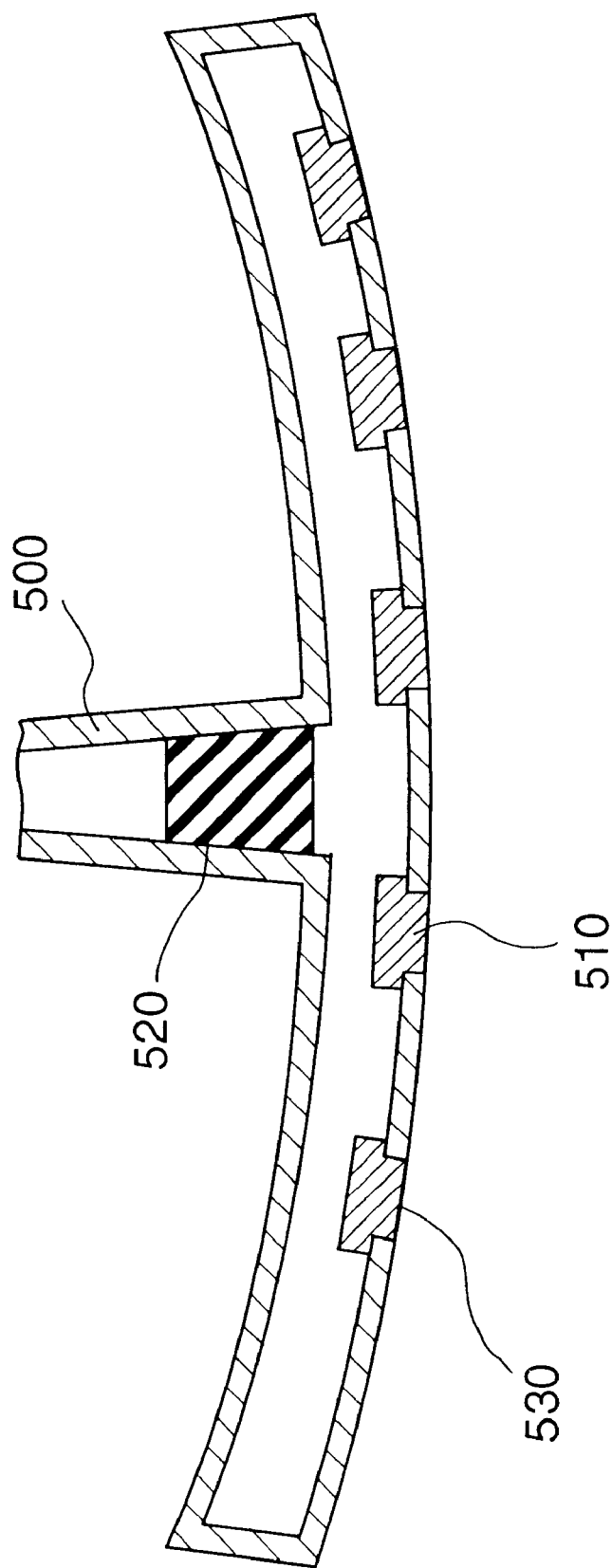
FIG. 33 is a sectional view showing an example of a slot waveguide.

To avoid such a problem, in the present invention, dielectric members 510 are preferably buried in slots 530 of a waveguide 500 without using any dielectric plate, as shown in FIG. 33. When no dielectric plate is used in this manner, microwaves having a very small width are introduced, as shown in FIG. 32C. As a result, a plasma having a higher density than that obtained by inputting identical microwave electric power can be excited, and the gain of the laser can be increased.

Figure 35A:
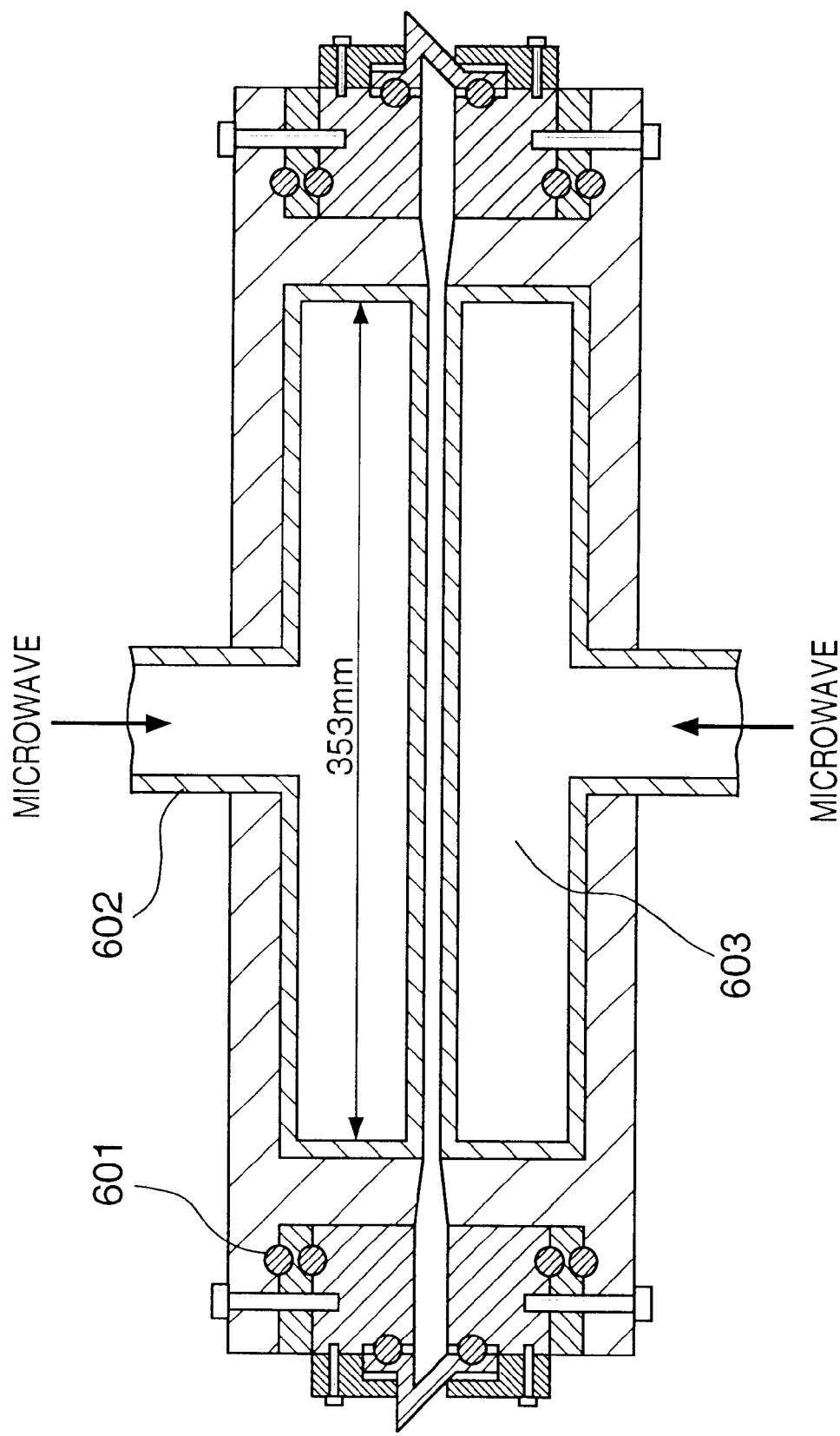
Figure 35C:
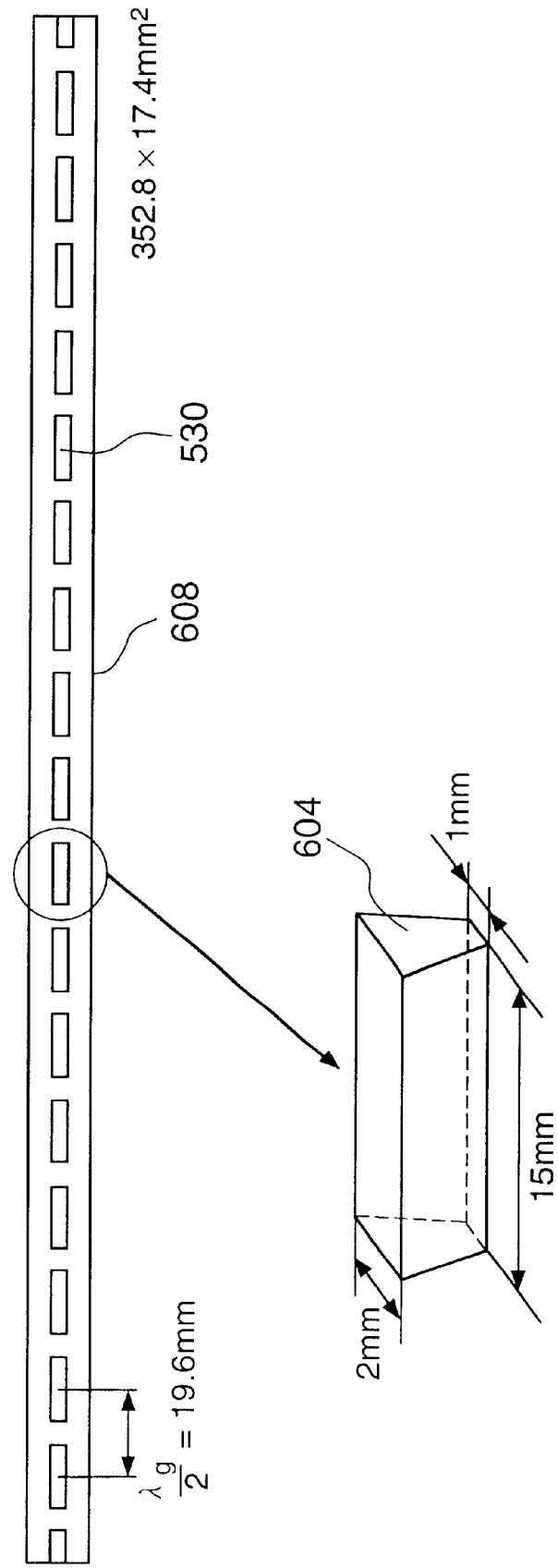
FIG. 35C is a plan view showing an example of the slot shape.

FIGS. 35A to 35C show an excimer laser oscillation apparatus according to another embodiment of the present invention. The shape of the dielectric member buried in each slot 530 is not limited to the one shown in FIG. 32C. This dielectric member may take any shape like a wedge-shaped dielectric member 604 shown in FIG. 35C as long as it has a structure designed to obtain the same effect as described above, i.e., the capability of introducing microwaves having a very small width.

To obtain the same effect as described above, i.e., the capability of introducing microwaves having a very small width, a plurality of dielectric members as in FIG. 32C may be integrated and placed inside the slot waveguide. More specifically, one dielectric member is prepared by integrating a plurality of dielectric members 604 to be buried in a plurality of slots 530 of a slot waveguide 608 shown in FIG. 35C. This dielectric member may be placed inside the slot waveguide 608 to be buried in the slots 530 at once. In this case, the integrated dielectric member is shaped such that a plurality of dielectric members to be buried in the respective slots are added to the surface of one dielectric member plate in the form of recesses/projections. This single integrated dielectric member may be obtained by forming recesses/projections on the surface of one dielectric member surface or bonding dielectric members 604 to the surface of one dielectric member plate.

Alternatively, the above single integrated dielectric member and a dielectric member 603 placed inside a rectangular waveguide 602 for guiding microwaves, as shown in FIG. 35B, may be further integrated into one dielectric member.

As shown in FIGS. 35A and 35C, the dielectric member 603 placed inside the slot waveguide and the dielectric member 604 for sealing each slot may be made of different dielectric materials. In this case, it is preferable that the dielectric member 604 for sealing each slot located on the laser chamber side, as shown in FIG. 35B, i.e., the side where the dielectric member comes into contact with fluorine gas, be made of a fluorine-resistant material, e.g., $CaF_2$, and the integrated dielectric member 603 placed inside the slot waveguide that does not directly come into contact with fluorine gas be made of a material such as alumina that is lower in fluorine resistance that $CaF_2$ or the like but is less expensive and has higher workability. The dielectric member for sealing the waveguide may be made of $CaF_2$ and alumina as well as aluminum nitride, for instance, that absorbs few microwaves and has high thermal conductivity. Referring to FIGS. 35A and 35B, reference numeral 602 denotes a rectangular waveguide for guiding microwaves; and 601, an O-ring.

A characteristic feature of the arrangement shown in FIG. 35B is that a waveguide with a slot (a portion for guiding microwaves into the laser chamber) 608 has a taper angle 607 in the gas introduction direction. With the taper angle 607 of the electrode portion 608, for example, introduction of a gas flow after adjustment by a gas flow adjusting plate is facilitated, and ultraviolet light from a preliminary ionization unit 606 can reach a portion near a slot 530 more easily. In this case, the taper angle 607 is preferably set to about 5° to 60° in consideration of introduction of a gas flow and ease with which ultraviolet light reaches each slot.

In the present invention, as described in the embodiment shown in FIGS. 31A and 31B, 35A and 35B in order to double the gain, the two microwave introduction means are prepared and vertically arranged to be symmetrical about the optical axis 350. As in the embodiment shown in FIGS. 31A and 31B, therefore, the distance between the two microwave introduction means can be easily adjusted by only adding an interval adjusting mechanism to the coupling portion (not shown) between the upper and lower microwave introduction means. That is, the distance between the waveguide with slot 608 (FIG. 35B) attached to the respective microwave introduction means can be easily adjusted.

Since the distance between the upper and lower electrodes can be changed in this manner, an optimal antenna interval can be set without greatly changing the arrangement. That is, since plasmas are produced in different manners depending on the inter-electrode distances, a desired interval can be set without greatly changing the arrangement while the characteristics of laser beams are evaluated.

Figure 34A:
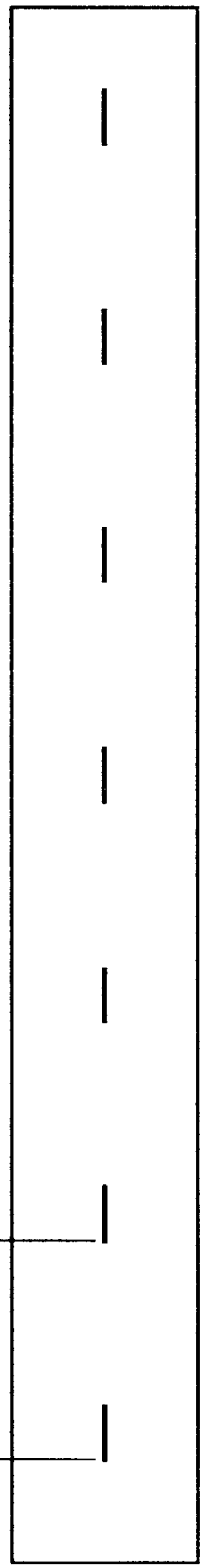
FIGS. 34A and 34B are plan views showing an example of the slot shape.
Figure 34B:
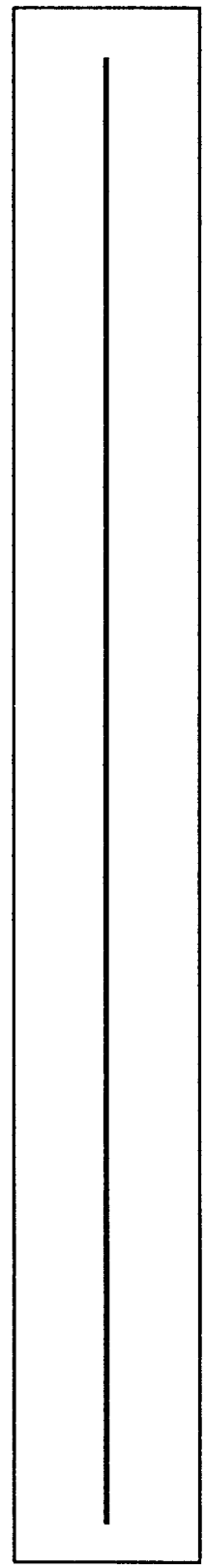

As the slot shape, a rectangular shape whose long side extends in the optical axis direction is preferable, as shown in FIGS. 34A and 34B. In this case, the slot shape preferably has a long side with about $\lambda_g/4 \times 1$ or 2 mm from the viewpoint of microwave concentration intended for laser excitation.

A single, continuous rectangle may be formed (FIG. 34B), but rectangles are preferably formed intermittently.

When the long side of each rectangle is set parallel to the optical axis direction, a narrow plasma can be excited. As a result, a plasma having a higher density than that obtained by inputting identical microwave electric power can be excited, and the gain of the laser can be increased.

Supply Mode of Laser Gas

FIGS. 24A and 24B (FIG. 24B is a sectional view of a portion E—E in FIG. 24A) show an excimer laser oscillation apparatus according to another embodiment of the present invention. The microwave introduction method and arrangement are the same as those in the excimer laser oscillation apparatus shown in FIGS. 13A and 13B, and microwaves generated by a gyrotron as a microwave power supply (not shown) are introduced into a laser tube 2 via a rectangular waveguide 1 and a slot plate 3.

On the other hand, in the apparatus described above with reference to FIGS. 13A and 13B, the laser gas can be supplied from one end portion of the laser tube in the longitudinal direction, and can be exhausted from the other end portion in the longitudinal direction. In contrast to this, in the excimer laser oscillation apparatus of this embodiment, elongated holes are formed along the longitudinal direction of the laser tube 2, and are used as laser gas outlet ports 22. With this arrangement, the laser gas supplied from an inlet port 21 is exhausted from the outlet ports 22 on both sides via the discharge space in the laser tube.

In order to stably obtain a continuously emitted excimer laser beam, a thin beam should be formed. For example, in order to obtain an output of 1 kW by a laser beam intensity of 1.3 MW/cm$^2$, a plasma need only be obtained within a region having a diameter of about 1 mm. Since the above-mentioned apparatus shown in FIGS. 24A and 24B can concentratively generate a plasma in such a narrow region, a thin, continuously emitted excimer laser beam can be obtained.

At this time, the reflectance of a mirror 6 is preferably set at 100%, and that of a mirror on the output side is preferably set at 99%.

In order to stably obtain a continuously emitted excimer laser beam, a state wherein fluorine molecules ($F_2$) and fluorine ions (F−) exit in the discharge space to be able to sufficiently form excimers (KrF*) must be set. For this purpose, it is preferable that a large amount of fresh fluorine gas ($F_2$) be supplied into the discharge space at high speed, and fluorine atoms (F) that return to the ground state after laser beam emission be exhausted from the discharge space.

In this embodiment, in order to attain high-speed circulation/substitution of the laser gas, laser gas inlet and outlet ports are formed, so that a fresh laser gas is supplied from a direction perpendicular to the longitudinal direction of the laser tube (the longitudinal direction of the discharge space), and the used laser gas is exhausted from that direction.

Such high-speed circulation of the gas also has an effect of cooling the laser tube since the gas and plasma present in the discharge space are substituted at high speed.

FIGS. 27A and 27B (FIG. 27B is a sectional view of a portion G—G in FIG. 27A) show the structure that can realize further high-speed circulation of the laser gas. The gas flow portion in the discharge space is narrower than a gas inlet portion 23 and a gas outlet port 24, and as a consequence, high-speed gas circulation/substitution is attained in the discharge space.

As for the layout of magnets 10 that confine a plasma in a narrow region, the present invention is not limited to the specific layout shown in FIGS. 24A and 24B, in which the magnets are arranged to generate lines of magnetic force in a direction to cross the longitudinal direction of the laser tube. For example, the magnets may be arranged to generate lines of magnetic force along the longitudinal direction of the laser tube.

FIGS. 25A and 25B (FIG. 25B is a sectional view of a portion F—F in FIG. 25A) show an excimer laser oscillation apparatus according to still another embodiment of the present invention.

The microwave introduction method and arrangement are the same as those in the excimer laser oscillation apparatus shown in FIGS. 16A and 16B, and microwaves generated by a gyrotron as a microwave power supply (not shown) are introduced into a laser tube 14 via a rectangular waveguide 12 and a gap. The microwaves propagate along the wall of the laser tube in the longitudinal direction to cause discharge in the laser tube 14, thereby generating a laser gas plasma.

The laser gas supply method of the apparatus shown in FIGS. 24A and 24B is different from that of the apparatus shown in FIGS. 16A and 16B. In the apparatus shown in FIGS. 16A and 16B, a laser gas is supplied from one end portion of the laser tube in the longitudinal direction to form a gas flow along the longitudinal direction. On the contrary, in the apparatus shown in FIGS. 25A and 25B, two elongated holes are formed in the side walls of the laser tube so that their longitudinal direction becomes parallel to that of the laser tube, and a laser gas is supplied from one hole and is exhausted from the other hole.

With this arrangement, the laser gas flows in the laser tube to cross the longitudinal direction of the laser tube. In this embodiment as well, since the gas and/or plasma in the discharge space can be substituted at high speed, excimers can be stably generated in the discharge space. Also, an effect of cooling the laser tube is expected.

The above-mentioned gas supply/exhaust method can be applied to all the apparatuses described with reference to FIGS. 7 to 22.

Upon supplying the laser gas, the pressure at the inlet port is preferably set at 1.2 to 1.8 times that at the outlet port, and more preferably, 1.2 to 1.5 times.

When the pressure at the inlet port is set at 1.2 times or more than that at the outlet port, the laser gas that passes through the laser chamber undergoes volume expansion, and cools the plasma excitation portion. On the other hand, when the pressure at the inlet portion exceeds 1.8 times that at the outlet port, the pressure difference becomes too large, and the pressure distribution offset in the laser chamber becomes large.

In addition, the installation of a gas reservoir in the gas flow makes time for allowing $F_2$ to return to the slot positions for microwave excitation until fluorine radicals used for laser oscillation circulate over the gas flow and return to the slot positions after they are exhausted. This makes it possible to always supply $F_2$ to the slot positions and prevent interruption of laser oscillation due to exhaustion of $F_2$. Therefore, laser oscillation with a high repeating frequency can be performed.

Cooling

Since a laser beam of about 10 W is obtained by introducing microwaves of about 100 W to 1 kW, a considerable amount of heat is produced. Since the wavelength changes if thermal expansion occurs, precise cooling is required. It is preferable that this portion use a metal free from any thermal expansion, and copper or silver plating be formed on its inner surface.

Figure 20A:
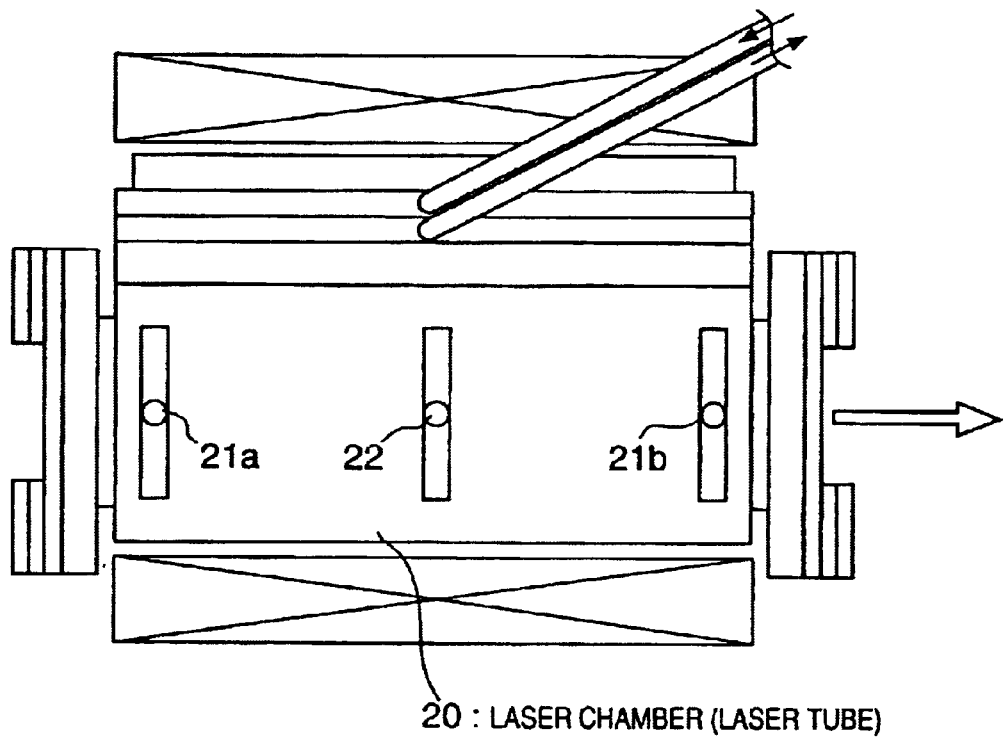
FIG. 20A shows a front view and FIG. 20B shows a side view of an excimer laser oscillation apparatus according to an example.
Figure 20B:
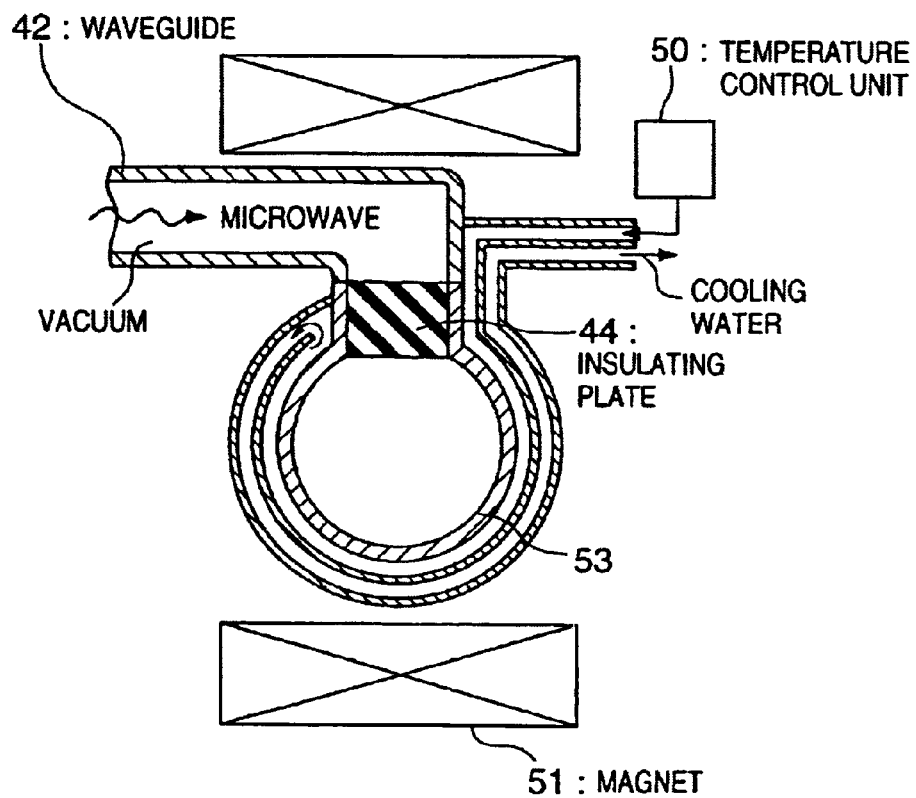

The reason why the plasma excitation portion is made up of a metal is to improve the cooling efficiency. Water cooling is attained while controlling the cooling water temperature, cooling water flow rate, and cooling water pressure. For example, FIG. 20 shows this state.

Cooling is preferably performed by a cooling device. When cooling water is deaerated and the water supply pressure is set at about 1 kg/cm$^2$, conveniently no vibration is generated upon supplying cooling water with pressure.

Resonator

When a pair of reflection mirrors are arranged on the optical axis of the laser tube, a laser beam can be taken out by stimulated emission.

When a continuously emitted excimer laser beam is obtained by maintaining the light intensity at a given level while decreasing the beam spot size, as will be described later, it is preferable that the reflectance of one reflection mirror be set at 100% and that of the output-side reflection mirror from which a laser beam is taken out be set at 99.0%.

On the other hand, when the light intensity is maintained by extremely eliminating losses that occur upon reflection, the reflectance of one reflection mirror is preferably set at 100%, and that of the output-side reflection mirror is preferably set at 99.5% or higher, and more preferably, 99.9% or higher.

Figure 28A:
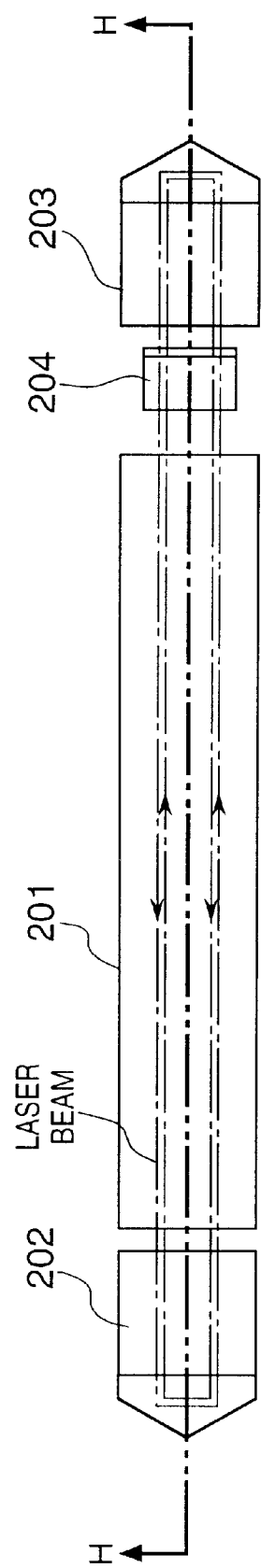
FIGS. 28A and 28B are respectively a front view and a side view of a resonator which sets a reflectance of 100% at both ends using prisms.
Figure 28B:
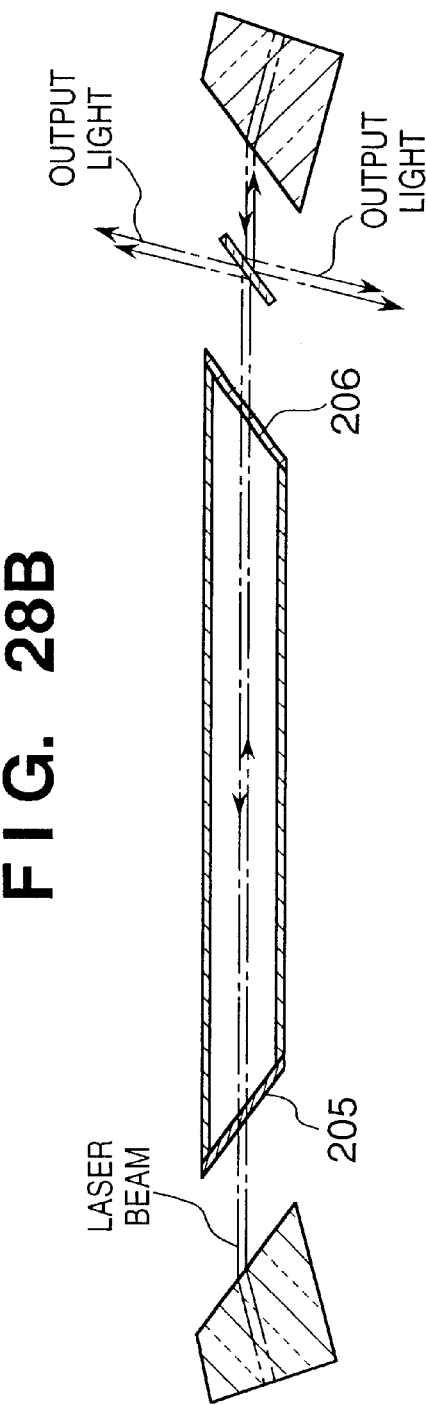

FIGS. 28A and 28B (FIG. 28B is a sectional view of a portion H—H in FIG. 28A) show the arrangement of a resonator in which reflectances at both ends become 100% using prisms. The incident angles to total reflection prisms 202 and 203 are Brewster angles, and no light amount losses are produced upon incidence of light. Reflection inside the total reflection prisms 202 and 203 utilizes total reflection, and no light losses occur upon reflection, either. Accordingly, the reflectances at both ends of the resonator become 100%. The reflectance of outgoing light can be set within the range from 0% to several % by adjusting the incident angle on an outgoing light taking out plate 204 arranged between a laser tube 201 and the total reflection prism 202.

Exposure Apparatus

FIG. 1 shows an exposure apparatus using an excimer laser oscillation apparatus.

Light output from an oscillation apparatus A1 is supplied to a scanning optical system via a mirror and a lens A2.

The scanning optical system has a scanning lens A4 and a scanning mirror A3 whose angle can be changed. Light output from the scanning optical system is irradiated onto a reticle A6 having a mask pattern via a condenser lens A5. The illumination optical system of the exposure apparatus has the above-mentioned arrangement.

Light having a density distribution corresponding to the predetermined mask pattern on the reticle A6 is imaged on a wafer A8 placed on a stage A9 by an imaging optical system having an objective lens A7, and a latent image corresponding to the mask pattern is formed on a photosensitive resist on the surface of the wafer A8.

As described above, the exposure apparatus shown in FIG. 1 comprises the excimer laser oscillation apparatus A1, the illumination optical system, the imaging optical system, and the stage A9 that holds the wafer A8.

In this apparatus, a narrow-band module (not shown) is arranged between the oscillation apparatus A1 and the scanning optical system. Also, the oscillation apparatus A1 itself is of a pulse oscillation type.

Output Method Example of Exposure Apparatus

In order to turn on/off the use of outgoing light of the continuous emission excimer laser, the following methods may be used.
(1) A cutoff means is arranged outside the excimer laser device.
(2) The continuous excitation means is turned on/off.

However, in method (1), since an excimer laser outputs deep UV light, and the output is higher than those of other laser, the cutoff means is considerably damaged, and the service life of the cutoff means is short. The service life of a cutoff means that uses an AO (acoustooptic) element having high response characteristics is particularly short. Even when the outgoing light is cut off, since oscillation continues inside the laser, the optical system in the laser is unwantedly damages, and its service life is shortened.

In method (2), in order to forma stable excited state, a certain period of time is required. For this reason, desired continuous oscillation light cannot be obtained immediately after the continuous excitation means is turned on.

The present invention will be described in detail below with the aid of the illustrated embodiment.

Figure 22:
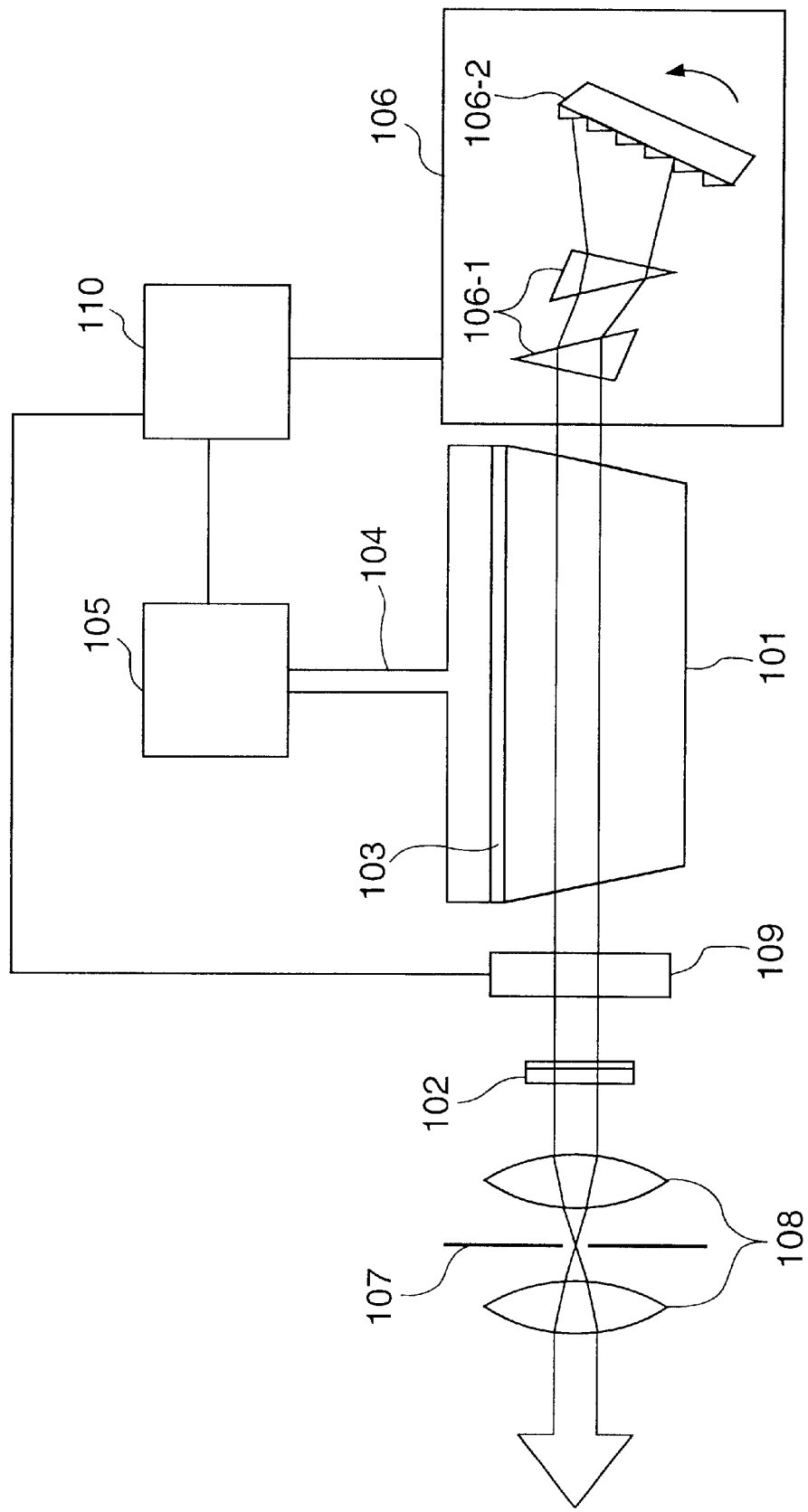
FIG. 22 is a schematic view showing an excimer laser according to the example of the present invention.

FIG. 22 is a schematic diagram of a continuous oscillation excimer laser according to the present invention. The excimer laser comprises a laser chamber 101 in which Kr, Ne, Ar, He and $F_2$ gases are sealed, an output mirror 102 for outputting light from the laser, a dielectric member 103 for introducing microwaves into the laser chamber, a slot waveguide 104 for guiding microwaves, and a microwave generator 105 for supplying microwaves. A wavelength selection unit 106 selects the oscillation wavelength, and is made up of a magnifying prism 106-1 which consists of a pair of prisms and magnifies the beam spot size, and a diffraction grating 106-2 for extracting an arbitrary wavelength. A spatial filter 107 is arranged at the focal point position of the laser-side lens of a beam shaping optical system 108 consisting of a pair of lenses, and controls the divergence angle of outgoing light from the laser. A shutter 109 is arranged between the laser chamber and the output mirror. A control system 110 controls the wavelength selection unit 106, the microwave generator 105, and the shutter 109.

Note that the output mirror 102 and the diffraction grating 106-2 make up a resonator of the excimer laser.

Description of Operation

Microwaves supplied from the microwave generator 105 are guided by the slot waveguide 104, and continuously excite an excimer laser gas in the laser chamber 101 via the dielectric member 103. Light from the excited excimer laser gas enters the diffraction grating 106-2 via the magnifying prism 106-1. Only light in a predetermined wavelength region returns from the diffraction grating to the laser chamber 101 via the magnifying prism 106-1, and brings about induced excitation emission by the excited excimer laser gas. The light is sequentially subjected to the induced emission while traveling back and forth in the optical resonator made up of the output mirror 102 and the diffraction grating 106-2, and only the light in the predetermined wavelength region selected by the diffraction grating is amplified. Some light components of sensitized light are output via the output mirror 102.

The operation for turning on/off the use of outgoing light from the continuous oscillation excimer laser will be explained below.

When outgoing light from the continuous oscillation excimer laser is to be cut off, the control system 110 closes the shutter 109 to cut off light coming from the excimer laser gas to the output mirror 102 while continuously supplying microwaves. Light which has been oscillating in the optical resonator ceases to oscillate, and outgoing light from the continuous oscillation excimer laser can be immediately cut off.

When outgoing light from the continuous oscillation excimer laser is used again, the control system 110 opens the shutter 109 to allow light coming from the excimer laser gas to reach the output mirror 102, while continuously supplying microwaves. Light spontaneously emitted by the excimer laser gas immediately stably oscillates in the optical resonator, and stable outgoing light can be obtained from the continuous oscillation excimer with high response characteristics.

Another operation for turning on/off the use of outgoing light from the continuous oscillation excimer laser will be explained below.

Figure 23:
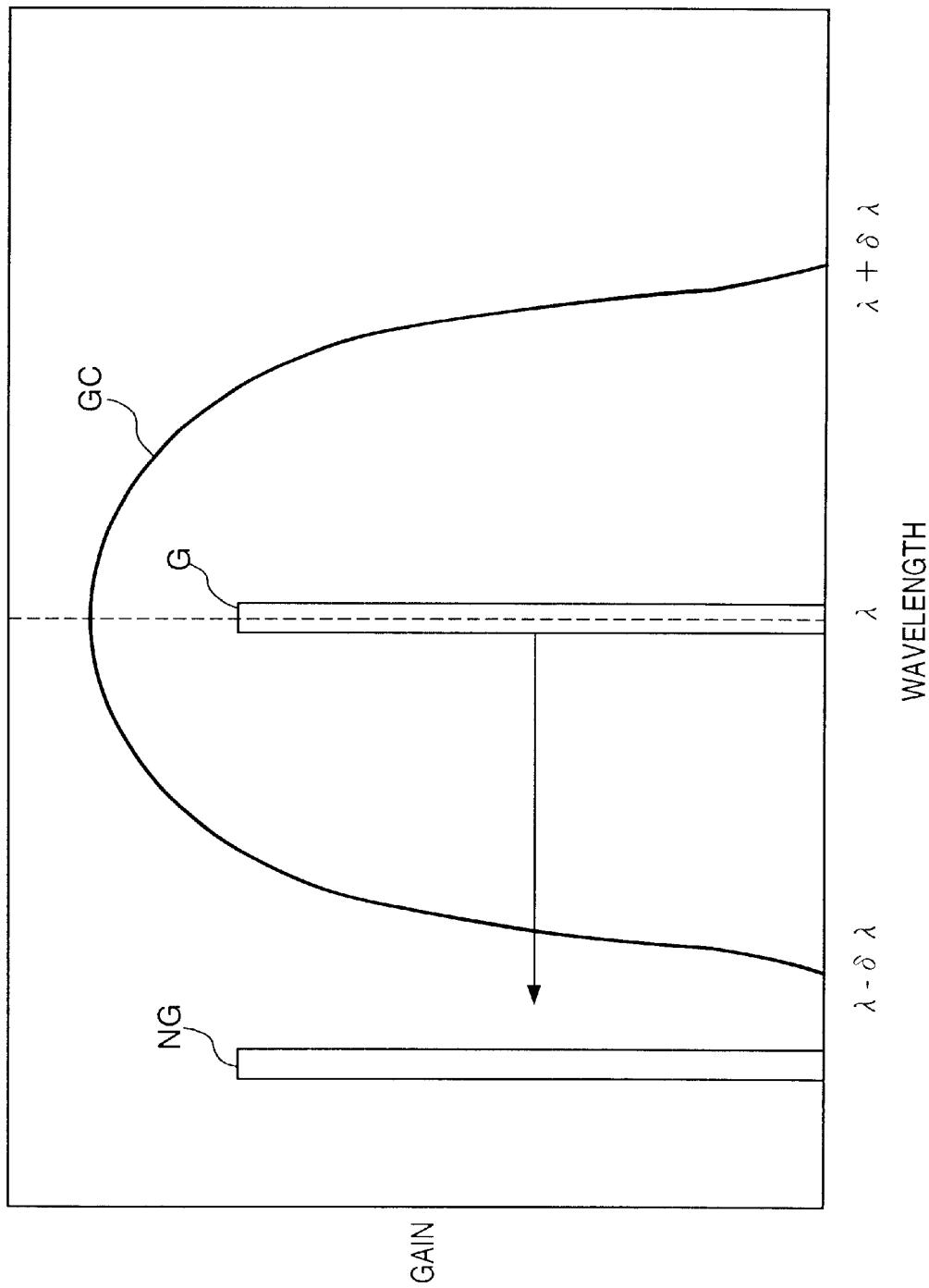
FIG. 23 is a graph showing a gain curve in the excimer laser according to the example of the present invention.

When outgoing light from the continuous oscillation excimer laser is to be cut off, the control system 110 pivots the diffraction grating 106-2 while continuously supplying microwaves. With this operation, light in the predetermined wavelength region selected by the diffraction grating is changed, and only light in the changed wavelength region returns to the laser chamber 101 via the magnifying prism 106-1. At this time, since the changed wavelength region is different from the wavelength in the oscillation region determined by the type of excimer laser gas, the returned light does not cause induced excitation emission by the excited excimer laser gas. Hence, light ceases to oscillate, and the outgoing light from the continuous oscillation excimer laser can be immediately cut off. This phenomenon will be described below with reference to FIG. 23.

Normally, the gain of the excimer laser with respect to the wavelength is determined depending on the type of gas. This relationship is represented by gain curve GC in FIG. 23. At this time, when light (G) in a wavelength region ($\lambda-\delta\lambda$ to $\lambda+\delta\lambda$) with a gain enters the excited excimer laser gas, it undergoes induced excitation emission, and the excimer laser oscillates. On the other hand, when light in a region (NG) different from the wavelength region ($\lambda-\delta\lambda$ to $\lambda+\delta\lambda$) with a gain enters the excited excimer laser gas, it does not effect induced excitation emission, and the excimer laser does not oscillate. This embodiment utilizes this phenomenon, and when outgoing light of the continuous oscillation excimer laser is to be cut off, the diffraction grating 106-2 selects light in a region different from the wavelength region ($\lambda-\delta\lambda$ to $\lambda+\delta\lambda$) with a gain as light that returns to the laser chamber.

At this time, although the excimer laser does not oscillate but outputs spontaneously emitted light, most of the light is cut off by the spatial filter 107 since it has no directivity.

When outgoing light from the continuous oscillation excimer laser is used again, the control system 110 pivots the diffraction grating 106-2 while continuously supplying microwaves. In this case, the diffraction grating selects the wavelength in the oscillation region, and only light in the selected region returns to the laser chamber 101 via the magnifying prism 106-1. The returned light immediately produces induced excitation emission by the excited excimer laser gas, and oscillates in the optical resonator. In this manner, stable outgoing light can be obtained from the continuous oscillation excimer laser with high response characteristics.

EXAMPLE

FIG. 20 shows the continuous emission excimer laser apparatus used in this example.

In this example, a cylindrical resonator was used as an optical resonator. A reflection-free film was formed on the inner surface of the optical resonator. The uppermost surface of the resonator consisted of a fluoride. A jacket-like cooling device was arranged on the outer surface of the resonator. The uppermost surface of the cooling device was covered by a heat insulating member, and a means for controlling the temperature of incoming cooling water to be lower than the ambient temperature and to nearly match the temperature of outgoing cooling wafer was arranged. With this means, temperature drifts of the optical resonator could be minimized.

As a waveguide, the waveguide (5-mm high, 10-cm wide oversize waveguide) shown in FIGS. 17A and 17B was used, and its interior was evacuated to $10^{-4}$ Torr level.

On the other hand, in this embodiment as well, a magnetic field was formed by magnets to attain stable plasma excitation. An insulating plate 44 was formed with a multilayered coat reflection-free film consisting of $CaF_2$ and $MgF_2$ on the resonator side. A fluoride film was formed on the uppermost surface of the insulting plate.

Microwaves were generated by a gyrotron (tradename), and the supply frequency was set at 35 GHz. The gas composition was $Kr/Ne/F_2$, (3%:92%:5%).

The pressure was set at the atmospheric pressure. Hence, $\omega c=4.5 \, \omega$, and electrons collide 4.5 times during one cycle of the excitation frequency.

ωc: collision angular frequency

In this example, furthermore, as shown in FIG. 20, gas inlet ports 21a and 21b were formed on both end sides of a laser chamber 20, and a gas outlet port 22 was formed at the central portion of the chamber 20. With these ports, the supplied laser gas flowed toward the center. This is to also protect the surface of a light reflection plate on the output end, as described above. More specifically, since the uppermost surface of the light reflection plate is coated with, e.g., a thin fluoride film, it never reacts with $F_2$ and $F^*$. The reflectance of the light reflection plate was set at 99% or higher.

In this example, the magnets 51 were arranged to apply a DC magnetic field in a direction nearly perpendicular to the microwave discharge.

Figure 21:
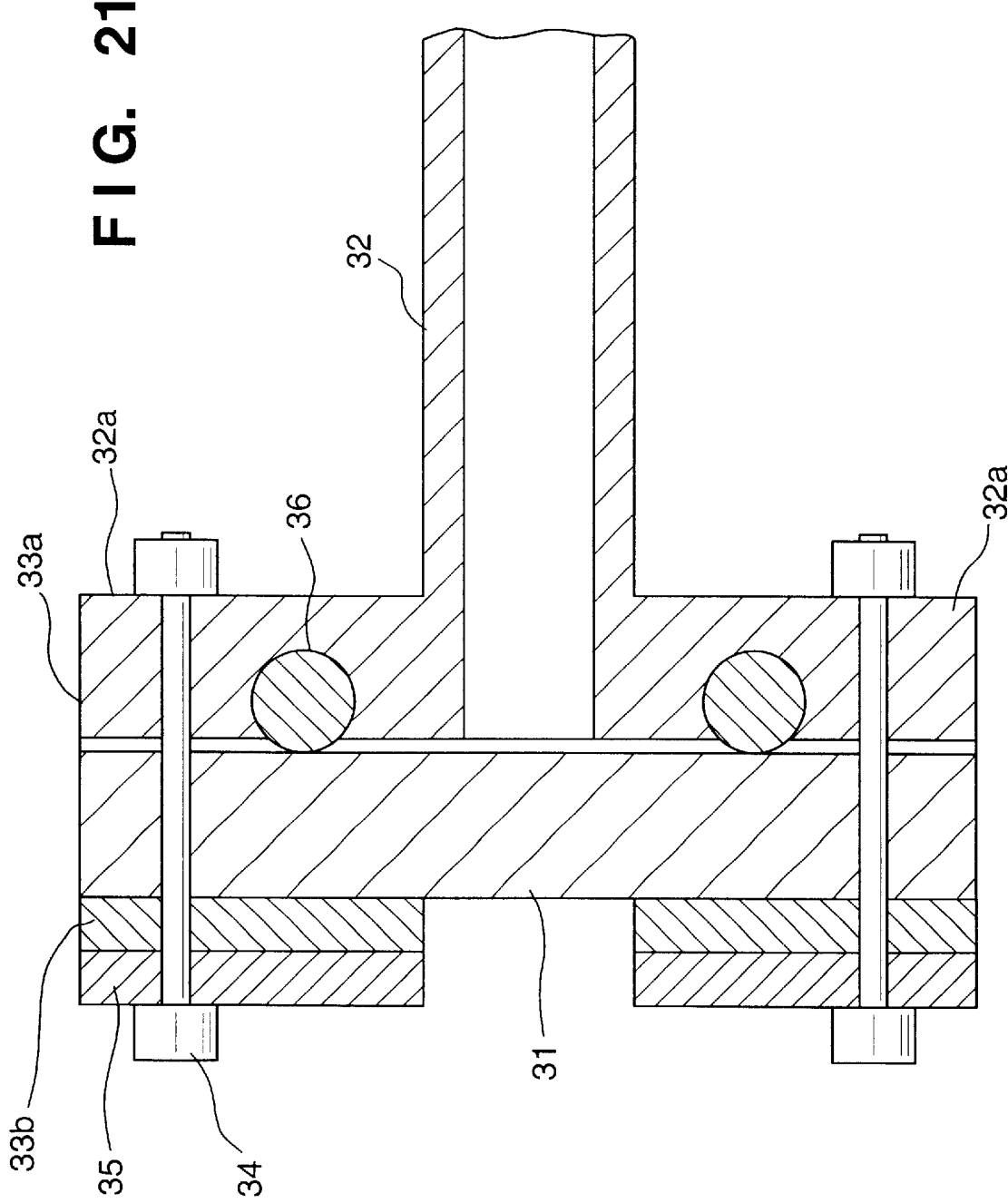
FIG. 21 is a sectional view showing the seal structure between a light reflection plate and a laser tube (metal cylinder) in the excimer laser oscillation apparatus according to the embodiment.

An optical oscillator consisted of a metal cylinder having an inner diameter of several mm to several cm. The inner surface of the metal cylinder was coated with a reflection-free multilayered film. A fluoride film was formed on the uppermost surface of the metal cylinder. Sealed bonding between a light reflection plate 31 and the laser tube (a metal cylinder 32 in this embodiment) that made up the laser chamber was attained, as shown in FIG. 21.

More specifically, the reflection plate 31 and the metal cylinder 32 were in press-contact with each other by fastening bolts 34 while interposing a Teflon (trademark) plate ring 33a between the light reflection plate 31 and a flange 32a of the metal cylinder 32, and interposing a Teflon (trademark) plate ring 33b and a metal plate ring 35 between the bolts and the outer surface of the light reflection plate 31. note that a seal was provided by an O-ring 36. Of course, they may be attached by screws using a bearing in place of the bolts 34.

Upon executing light emission by the above-mentioned arrangement, continuous emission having a sufficiently high output was achieved.

When a stepper was built using the continuos emission excimer laser oscillation apparatus, the arrangement was simplified and the service life of the lens material and the like was improved.

Other Examples

When losses in the resonator were extremely eliminated using the apparatuses shown in FIGS. 24A, 24B, 25A, and 25B, a stably, continuously emitted excimer laser beam could be obtained.

For example, the laser gas pressure was set at 65 Torr to suppress energy losses caused by the gas to 1%. In addition, a stable resonator was constructed by setting the reflectance of one reflection mirror at 100% and that of the output-side reflection mirror at 99.5% or higher. With this arrangement, the gain required for laser oscillation could be set at 2% or higher (reciprocal), and was larger than the losses.

When microwave energy of 35 GHz is used and the pressure in the laser tube is set at 60 Torr, since losses by the gas slightly increase, the reflectance of the output-side reflection mirror is preferably set at 99.9% or higher.

Example of Device Fabrication Method

Next, an embodiment of a semiconductor device fabrication method using the exposure method explained above will be described below.

Figure 36:
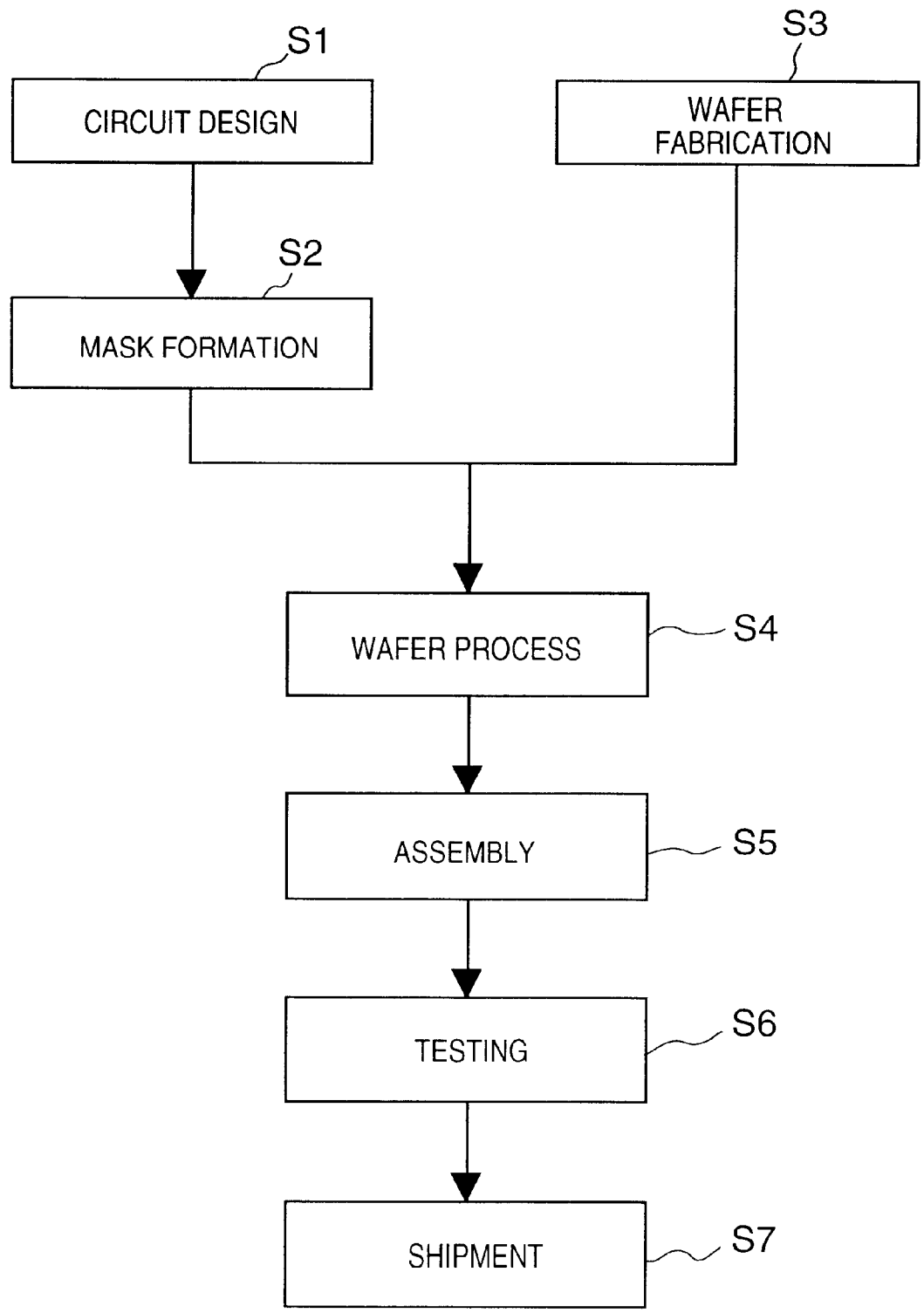
FIG. 36 is a view showing the flow of microdevice fabrication.

FIG. 36 shows the flow of fabrication steps for fabricating microdevices (e.g., semiconductor chips such as ICs and LSIs, liquid crystal panels, CCDs, thin-film magnetic heads, micromachines, or the like). First, in step 1 (circuit design), device patterns are designed. In step 2 (mask formation), a mask having the designed patterns is formed. In step 3 (wafer fabrication), wafers are fabricated by using materials such as silicon or glass. Step 4 (wafer process) is called a pre-process in which actual circuits are formed on the wafers by the photolithography technique by using the mask and the wafers prepared as above. Step 5 (assembly) is called a post-process in which semiconductor chips are formed from the wafers formed in step 4. This process includes steps such as an assembly step (dicing and bonding) and a packaging step (chip encapsulation). In step 6 (testing), tests such as an operation test and a durability test are conducted ion the semiconductor devices fabricated in step 5. The semiconductor devices are completed through these steps and shipped (step 7).

FIG. 37 shows a detailed flow of the wafer process described above. In step 11 (oxidation), the surfaces of the wafers are oxidized. In step 12 (CVD), insulating films are formed on the wafer surfaces. In step 13 (formation of electrodes), electrodes are formed on the wafers by vapor deposition. In step 14 (ion implantation), ions are implanted into the wafers. Instep 15 (resist processing), the wafers are coated with a photosensitive agent. In step 16 (exposure), the projecting exposure apparatus explained above is used to expose the wafers to the circuit patterns of the mask. In step 17 (development), the exposed wafers are developed. In step 18 (etching), portions except for the developed resist image are etched away. In step 19 (resist removal), the unnecessary resist after the etching is removed. Multiple circuit patterns are formed on the wafers by repeating these steps.

The fabrication method of this embodiment can fabricate highly integrated semiconductor devices, which are conventionally difficult to fabricate, at low cost.

The effects of the present invention have been described in detail above from the viewpoint of the realization of a continuous emission excimer light source. As is obvious, however, the present invention provides sufficient effects in increasing the repeating frequency of a pulse oscillation type excimer laser and pulse stretching in a case of a short pulse emission width of 10 to 20 nsec.

According to the present invention, an excimer laser oscillation apparatus and a stepper can be provided, which can reduce the load on the lens material and its surface and simplify the mirror or laser scanning control system.

First, damage to the optical material such as glass is reduced. A general excimer laser such as a KrF laser, an ArF laser, or the like produces pulse emissions as short as 10 to 20 nsec, while the repeating frequency of the pulse is about 1,000 Hz. Accordingly, the peak light intensity of this pulse is 10,000 times or more than that obtained by continuous emission at an identical intensity regardless of the efficiency of the optical system. The major cause of damage to the material in the excimer region lies in two-photon absorption, and optical damage in the existing excimer laser which is proportional to the square of the peak intensity of light is at least $10^4$ times stricter than those in continuous emission. The durability of the glass material poses a problem in the ArF region for the above-mentioned reasons. Hence, realization of a continuous emission light source can solve material problems in the ultraviolet region as well as the ArF region.

Second, production of speckles as a phenomenon inherent to light in a narrow band can be easily suppressed. In the case of pulse emission, in order to effectively remove speckles as random interference fringes, the light emission timings of the individual pulses and a known speckle removal means must be synchronized with high precision. In contrast to this, continuous oscillation does not require any special synchronization means, and speckles can be easily removed by a known, simple means such as a rotary diffusion plate. For this reason, the arrangement of the optical system can be simplified, and a cost reduction can be effectively attained.

Third, exposure amount control is easy. When discrete exposure such as pulse emission is performed, the minimum unit in exposure amount control basically depends on the number of pulses although it also depends on the controllability of the exposure amount per pulse. When exposure is attained by a total of 100 pulses, the next unit is 99 pulses or 101 pulses, and the control precision is ±1%. Of course, various means for controlling the last one pulse have been proposed, but finer exposure amount control free from any resolution owing to discreteness is preferably for controllability or control. As the line width decreases, stricter exposure amount control is required. Under such circumstances, the effect of the continuous emission light source is tremendous.

The present invention is not limited to the above embodiments and various changes and modifications can be made within the spirit and scope of the present invention. Therefore, to apprize the public of the scope of the present invention, the following claims are made.

What is claimed is:

1. An excimer laser oscillation apparatus comprising:
   a laser gas chamber for storing a laser gas; and
   a waveguide for introducing a microwave for exciting the laser gas,
   wherein said waveguide comprises slots buried with a first dielectric member formed in an outer wall portion thereof and filled with a second dielectric member made of a material different from said first dielectric member.

2. The apparatus according to claim 1, wherein said first dielectric member is a dielectric member made of $CaF_2$ or $MgF_2$, and said second dielectric member is a dielectric member made of alumina or aluminum nitride.

3. An excimer laser oscillation apparatus comprising:
   a laser gas chamber which stores a laser gas;
   a waveguide for introducing a microwave for exciting the laser gas, wherein a gas pressure of the laser gas falls within a range from several 1 atm to 3 atm, and said waveguide includes a slot-antenna, which guides the microwave to the laser gas pressure in said laser gas chamber,
   an outer surface of said laser gas chamber is covered by a jacket-like cooling device whose uppermost surface is covered by a heat insulating member; and
   cooling means for controlling a temperature of incoming cooling water to be lower than ambient temperature and to nearly match the temperature of outgoing cooling water with the ambient temperature.

4. The apparatus according to claim 3, wherein a pair of microwave introduction means equivalent to said microwave introduction means are arranged to sandwich an optical axis therebetween.

5. An excimer laser exposure apparatus comprising:
   said excimer laser oscillation apparatus defined in claim 1;
   a reticle which has the mask pattern;
   a stage for holding a wafer;
   an illumination optical unit for leading a beam oscillated from said excimer laser oscillation apparatus to the reticle; and
   an imaging optical unit for leading the beam from the reticle to the wafer held on the stage.

* * * * *

UNITED STATES PATENT AND TRADEMARK OFFICE
CERTIFICATE OF CORRECTION

PATENT NO. : 6,690,702 B1
DATED : February 10, 2004
INVENTOR(S) : Tadahiro Ohmi et al.

It is certified that error appears in the above-identified patent and that said Letters Patent is hereby corrected as shown below:

Title page,
Item [73] Assignees, "Tadahiro Ohmi, Miyaki-ken (JP)" should read -- Tadahiro Ohmi, Miyagi-ken (JP). --.
"*Assistant Examiner* - Armando Rodriquez" should read -- *Assistant Examiner* - Armando Rodriguez --.

Column 1,
Line 14, "one" should read -- the one --.
Lines 66-67, "$I_0$(watt)×10 (nsec)×$2_{33\ 10}^2$ (pulses)x$10^{31\ 2}$ (efficiency)=$2×10^{-2}$ (Joule)" should read -- $1_0$ (watt) × 10 (nsec) × $2 × 10^2$ (pulses) x $10^{-2}$ (efficiency) = $2 × 10^{-2}$ (Joule) --.

Column 2,
Line 18, "bout" should read -- about --.
Line 28, "laser" should read -- excimer laser --.

Column 8,
Line 17, "gain" should read -- gain g --.
Line 23, "h: Plank constant $6.63 × 10^{34}$ J.$_s$" should read -- h: Plant constant $6.63 × 10^{34}$ J·s --.
Line 32, "$I_s$+0.6 MW/cm$^2$." should read -- $I_s$=0.6 MW/cm$^2$. --.
Between lines 32 and 33, insert as a centered title -- Laser Taking Out Efficiency --.
Line 38, "$\eta_{ex}=(I/I_s)(1+(1+I/I_s)-\alpha_n/g_0)$" should read -- $\eta_{ex}=(I/I_s)(1-(1+I/I_s)-\alpha_n/g_0)$ --.

Column 9,
Line 66, "F-" should read -- F$^-$ --.

Column 10,
Line 6, "(F$_2$)" should read -- (F$_2$). --.

Column 11,
Lines 52-54, "$\omega=2\pi×35×10^9$    -- $\omega=2\pi×35×10^9[s^{-1}]$
$\mu_0=4\pi×10^{-7}$    $\mu_0=4\pi× 10^{-7}[H/m]$
$\sigma=12.8$." should read    $\sigma=12.8[\Omega·m^{-1}]$. --

Column 12,
Line 23, "amount" should read -- about --.
Line 63, "shows" should read -- shown --.
Line 65, "slog" should read -- slot --.

Column 14,
Line 37, "becomes" should read -- become --.
Line 38, "axis" should read -- tube axis --.

UNITED STATES PATENT AND TRADEMARK OFFICE
CERTIFICATE OF CORRECTION

PATENT NO. : 6,690,702 B1
DATED : February 10, 2004
INVENTOR(S) : Tadahiro Ohmi et al.

It is certified that error appears in the above-identified patent and that said Letters Patent is hereby corrected as shown below:

Column 15,
Line 15, "shown ion" should read -- shown in --.

Column 16,
Line 1, "AlN" should read -- AlN, --.

Column 17,
Line 42, "that" should read -- than --.

Column 21,
Line 40, "uses" should read -- use of --.
Line 44," damages," should read -- damaged, --.
Line 45, "forma" should read -- form a --.

Column 23,
Line 52, "insulting" should read -- insulating --.

Column 24,
Line 23, ""note" should read -- Note --.
Line 37, "extremely" should read -- essentially --.

Column 25,
Line 5, "ion" should read -- on --.
Line 15, "Instep" should read -- In step --.

Column 26,
Line 18, "apprize" should read -- apprise --.

Signed and Sealed this

Twenty-first Day of December, 2004

JON W. DUDAS
*Director of the United States Patent and Trademark Office*